United States Patent
Kitamura et al.

(10) Patent No.: US 10,496,279 B2
(45) Date of Patent: Dec. 3, 2019

(54) SLAVE DEVICE, CONTROL METHOD OF SLAVE DEVICE, NON-VOLATILE COMPUTER READABLE RECORDING MEDIUM

(71) Applicant: OMRON Corporation, Kyoto (JP)

(72) Inventors: Yasuhiro Kitamura, Ritto (JP); Shinji Murayama, Otsu (JP); Masao Koga, Kusatsu (JP); Toshiyuki Ozaki, Ritto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/869,036

(22) Filed: Jan. 12, 2018

(65) Prior Publication Data

US 2018/0267711 A1    Sep. 20, 2018

(30) Foreign Application Priority Data

Mar. 14, 2017   (JP) ................. 2017-048012

(51) Int. Cl.
*G06F 3/06* (2006.01)
*G06F 9/4401* (2018.01)
*G06F 13/38* (2006.01)
*G05B 19/042* (2006.01)

(52) U.S. Cl.
CPC ....... *G06F 3/0605* (2013.01); *G05B 19/0423* (2013.01); *G06F 3/065* (2013.01); *G06F 3/067* (2013.01); *G06F 3/0619* (2013.01); *G06F 3/0634* (2013.01); *G06F 9/4411* (2013.01); *G06F 13/385* (2013.01); *G05B 2219/1215* (2013.01); *G05B 2219/25204* (2013.01)

(58) Field of Classification Search
CPC ......... G06F 13/00; G07B 15/02; H04W 52/02
See application file for complete search history.

(56) References Cited

U.S. PATENT DOCUMENTS

| | | | | |
|---|---|---|---|---|
| 2001/0050778 A1* | 12/2001 | Fukuda | ................ | H04N 1/4095 358/1.9 |
| 2002/0150245 A1* | 10/2002 | Sugimoto | ............ | G11B 19/122 380/201 |
| 2005/0017875 A1* | 1/2005 | Nakayama | ........... | G05B 19/058 340/870.07 |
| 2012/0094722 A1* | 4/2012 | Kim | .................. | H04W 52/0251 455/566 |

(Continued)

FOREIGN PATENT DOCUMENTS

| | | |
|---|---|---|
| DE | 10211939 | 10/2003 |
| DE | 102011006590 | 5/2012 |

(Continued)

OTHER PUBLICATIONS

"Office Action of Europe Counterpart Application", dated Apr. 8, 2019, p. 1-p. 4.

(Continued)

*Primary Examiner* — Getente A Yimer
(74) *Attorney, Agent, or Firm* — JCIPRNET

(57) ABSTRACT

A device is easily exchanged without changing a program of a controller. A device communication management unit generates digital input data that stores only ON/OFF information of a device in accordance with a copy setting information table set by a user.

17 Claims, 12 Drawing Sheets

(56) References Cited

U.S. PATENT DOCUMENTS

2016/0062954 A1* 3/2016 Ruff .................. G06F 17/21
715/249

FOREIGN PATENT DOCUMENTS

EP          2990896      3/2016
JP        2008152317     7/2008

OTHER PUBLICATIONS

"Search Report of European Counterpart Application," dated Jul. 30, 2018, p. 1-p. 7.
"Office Action of Europe Counterpart Application", dated Dec. 4, 2018, p. 1-p. 5.

* cited by examiner

| PORT | COPY METHOD | FROM<br>BIT POSITION OF RECEIVED DATA (COPY SOURCE) | TO<br>BIT POSITION OF COPY DESTINATION |
|---|---|---|---|
| 1 | COPY FROM IO-LINK DATA | Bit14 | Bit0 |
| 2 | COPY FROM IO-LINK DATA | Bit7 | Bit1 |
| 3 | PIN2/SIO | | Bit2 |
| 4 | PIN2/SIO | | Bit3 |
| | | | ... |
| n | COPY FROM IO-LINK DATA | Bit0 | Bit ⌈n−1⌉ |

FIG. 4

SLAVE DEVICE, CONTROL METHOD OF SLAVE DEVICE, NON-VOLATILE COMPUTER READABLE RECORDING MEDIUM

CROSS-REFERENCE TO RELATED APPLICATION

This application claims the priority of Japan patent application serial no. 2017-048012, filed on Mar. 14, 2017. The entirety of the above-mentioned patent application is hereby incorporated by reference herein and made a part of this specification.

BACKGROUND

Technical Field

The disclosure relates to a slave device or the like that is connected to a master device and includes a communication port to which a device is connected.

Description of Related Art

In the related art, a master/slave control system that includes a master device and a slave device that is connected to the master device via a network is known.

For example, the following Patent Document 1 describes a programmable controller (master device) capable of exchanging an input/output unit (device) that is connected to a basic unit (slave device) with an input/output unit of the same type in a case in which matching determination is exempted.

[Patent Document 1] Japanese Unexamined Patent Application Publication No. 2008-152317 (Published on Jul. 3, 2008)

Here, it is not necessarily easy to prepare a device of the same type for exchanging a device to be connected to a slave device, and further, it is difficult to prepare a plurality of devices of the same type and the same model from the same manufacturer in advance. In addition, an arrangement position (storage position) of control information (ON/OFF information and the like) in data received from the device connected to the slave device differs for each device depending on a manufacturer, a specification, a type, and the like of the device when viewed from the slave device.

Therefore, in a case in which the device connected to the slave device is exchanged with a device from another manufacturer, for example, it is necessary to change programs and the like of a master device that refers to the control information from the device in accordance with the device after the exchange according to the related art as described above. That is, since it is necessary to change the programs and the like of the master device for exchanging the device connected to the slave device, the related art as described above has a problem that it takes a long time from the exchange of the device to execution of desired processing by the master device.

SUMMARY

An embodiment of the disclosure realizes a slave device and the like capable of easily exchanging a device to be connected to the slave device without changing the programs or the like of the master device that refers to ON/OFF information from the device.

An embodiment of the disclosure provides a slave device that is connected to a controller that serves as a master device and includes a communication port to which a device is connected, the slave device including: a data generation unit that generates first data that is data including ON/OFF information and analog information from the device; and a duplication unit that generates second data that is data storing only the ON/OFF information and to be delivered to the controller, from the first data in accordance with setting information set by a user, in which the setting information associates a storage position of the ON/OFF information in the first data with a storage position of the ON/OFF information in the second data.

The slave device according to an embodiment of the disclosure includes a plurality of communication ports, and the setting information associates a storage position of the ON/OFF information in the first data with a storage position of the ON/OFF information in the second data for each of the communication ports.

The slave device according to an embodiment of the disclosure may further include a storage unit that stores the setting information.

The slave device according to an embodiment of the disclosure may further include an operation receiving unit that receives a user's operation of setting or changing the setting information.

An embodiment of the disclosure provides a control method of a slave device that is connected to a controller that serves as a master device and includes a communication port to which a device is connected, the method including: a data generation step of generating first data that is data including ON/OFF information and analog information from the device; and a duplication step of generating second data that is data storing only the ON/OFF information and to be delivered to the controller, from the first data in accordance with setting information set by a user, in which the setting information associates a storage position of the ON/OFF information in the first data with a storage position of the ON/OFF information in the second data.

An embodiment of the disclosure achieves an effect that it is possible to easily exchange the device without changing the program or the like of the controller that refers to the ON/OFF information from the device connected to the slave device.

BRIEF DESCRIPTION OF THE DRAWINGS

FIG. 4 is a diagram illustrating an example of a data structure of a copy setting information table.

DESCRIPTION OF THE EMBODIMENTS

Figure 1:
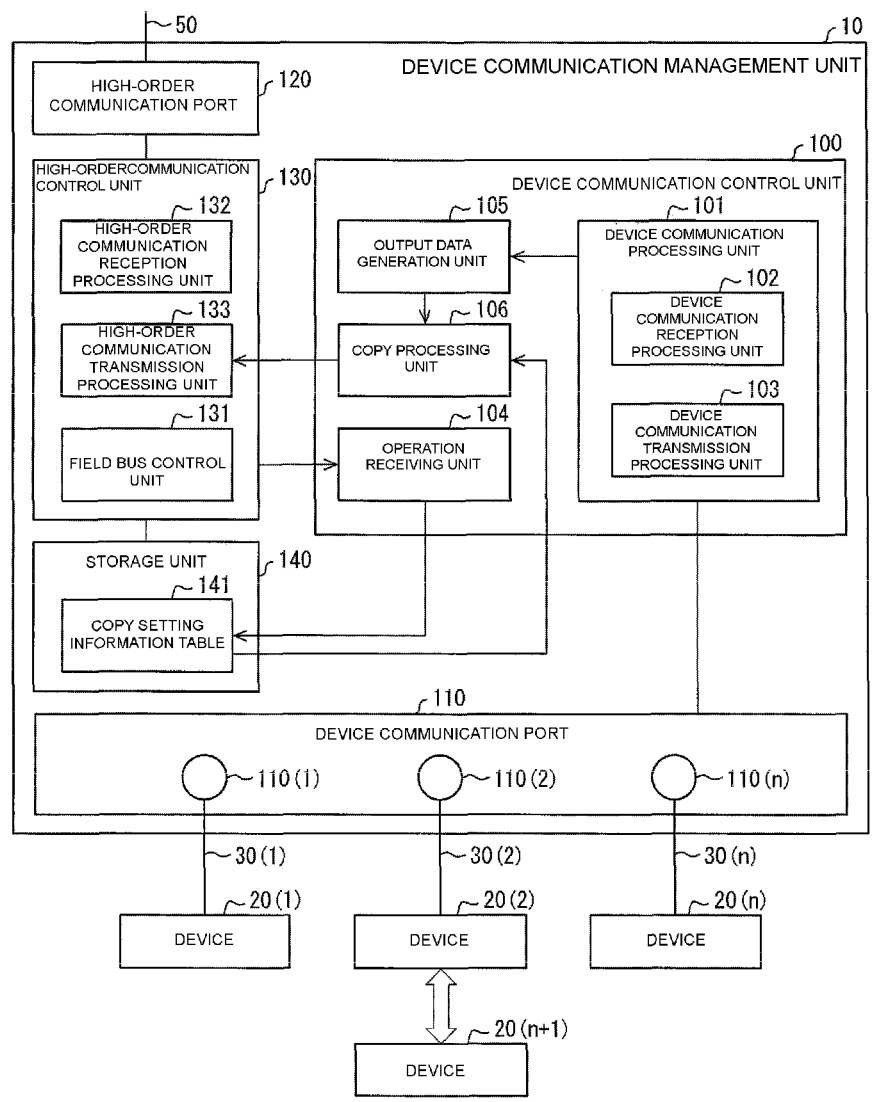
FIG. 1 is a block diagram illustrating a configuration of main parts of a device communication management unit according to a first embodiment of the disclosure.

According to the above configuration, the slave device generates the second data storing only the ON/OFF information and to be delivered to the controller, from the first data including the ON/OFF information and the analog information from the device in accordance with the setting information set by the user.

Here, the controller executes various control processing by utilizing the ON/OFF information from the device. In addition, a position where the ON/OFF information is stored in data output by the device and a position where the ON/OFF information is stored in the first data vary depending on devices.

Meanwhile, the ON/OFF information from the device is stored at a predetermined position in the second data in accordance with the setting information set by the user.

In addition, the controller can utilize the second data in which the ON/OFF information from the device is stored at a predetermined position in accordance with the setting information for executing various kinds of control processing by utilizing the ON/OFF information from the device.

In a case in which the device is exchanged, for example, the slave device can cause the controller to execute the control processing merely by changing the setting information in accordance with the device after the change without changing the program of the controller that refers to the ON/OFF information even in a case in which the device is exchanged. That is, the slave device can cause the controller to execute the control processing by utilizing the ON/OFF information stored at the predetermined position in the second data in accordance with the setting information set by the user.

Therefore, the slave device has an effect that the program of the controller that refers to the ON/OFF information is made to be independent from the device, for example, to facilitate recovery of the controller from the exchange or the like of the device, and a time required for the recovery can be shortened. That is, the slave device has an effect that the device can be easily exchanged without changing the program or the like of the controller that refers to the ON/OFF information from the device to be connected to the slave device.

According to the above configuration, the slave device includes the plurality of communication ports, and the setting information associates the storage position of the ON/OFF information in the first data with the storage position of the ON/OFF information in the second data for each of the communication ports.

That is, the ON/OFF information from each of a plurality of devices connected to each of the plurality of communication ports is stored at predetermined positions in the second data in accordance with the setting information set by the user for each communication port. Then, the controller can execute the control processing by utilizing the second data in which the ON/OFF information from each of the plurality of devices is stored at the predetermined positions in accordance with the setting information.

Therefore, the slave device has an effect that each of the plurality of devices can be easily exchanged without changing the program or the like of the controller that refers to the ON/OFF information from each of the plurality of devices connected to the slave device.

According to the above configuration, the slave device further includes a storage unit that stores the setting information that is information set by the user and associates the storage position of the ON/OFF information in the first data with the storage position of the ON/OFF information in the second data.

That is, the slave device generates the second data that stores only the ON/OFF information from the first data in accordance with the setting information stored in the storage unit of the device itself. Therefore, the slave device has an effect that it is possible to facilitate recovery of the controller from the exchange or the like of the device without acquiring the setting information from an external device such as the controller and to shorten a time required for the recovery. That is, the slave device has an effect that it is possible to easily exchange the device without acquiring the setting information from the external device such as the controller and without changing the program or the like of the controller.

According to the above configuration, the slave device further includes an operation receiving unit that receives a user's operation of setting or changing setting information that is information set by the user and associating a storage position of the ON/OFF information in the first data with a storage position of the ON/OFF information in the second data.

That is, the slave device generates the second data that stores only the ON/OFF information from the first data in accordance with the setting information which is set or changed by the user's operation received by the operation receiving unit.

Even in a case in which the device is exchanged, for example, the slave device can cause the controller to execute the control processing merely by changing the setting information according to the user's operation received by the operation receiving unit in accordance with the exchange of the device.

Therefore, the slave device has an effect that it is possible to facilitate recovery of the controller from the exchange or the like of the device merely by setting or changing the setting information according to the user's operation received by the operation receiving unit and to shorten the time required for the recovery. That is, the slave device has an effect that the device can be easily exchanged without changing the program or the like of the controller, by utilizing the setting information set or changed by the user.

According to the method, the control method generates the second data storing only the ON/OFF information and to be delivered to the controller, from the first data that includes the ON/OFF information and the analog information from the device in accordance with the setting information set by the user.

Here, the controller executes various kinds of control processing by utilizing the ON/OFF information from the device. In addition, a position where the ON/OFF information is stored in the data output by the device and a position where the ON/OFF information is stored in the first data differ for each device.

In contrast, the ON/OFF information from the device is stored at a predetermined position in the second data in accordance with the setting information set by the user.

In addition, the controller can utilize the second data in which the ON/OFF information from the device is stored at the predetermined position in accordance with the setting information for executing various kinds of control processing by utilizing the ON/OFF information from the device.

Even in a case in which the device is exchanged, for example, the slave device can cause the controller to execute the control processing merely by changing the setting information without changing the program of the controller that refers to the ON/OFF information. That is, the slave device can cause the controller to execute the control processing by utilizing the ON/OFF information stored at the predetermined position in the second data in accordance with the setting information set by the user.

Therefore, the control method has an effect that the program of the controller that refers to the ON/OFF information is made to be independent from the device, for example, to facilitate recovery of the controller from the exchange or the like of the device, and a time required for the recovery can be shortened. That is, the control method has an effect that the device can be easily exchanged without changing the program or the like of the controller that refers to the ON/OFF information from the device to be connected to the slave device.

First Embodiment

Hereinafter, a first embodiment of the disclosure will be described in detail with reference to FIGS. 1 to 12. The same reference numerals will be given to the same or corresponding parts in the drawings, and description thereof will not be repeated. For easy understanding of device communication management units 10 (slave devices) according to an aspect of the disclosure, an outline of a control system 1 including the device communication management units 10 will be described first with reference to FIG. 2.

(Outline of Control System According to First Embodiment)

Figure 2:
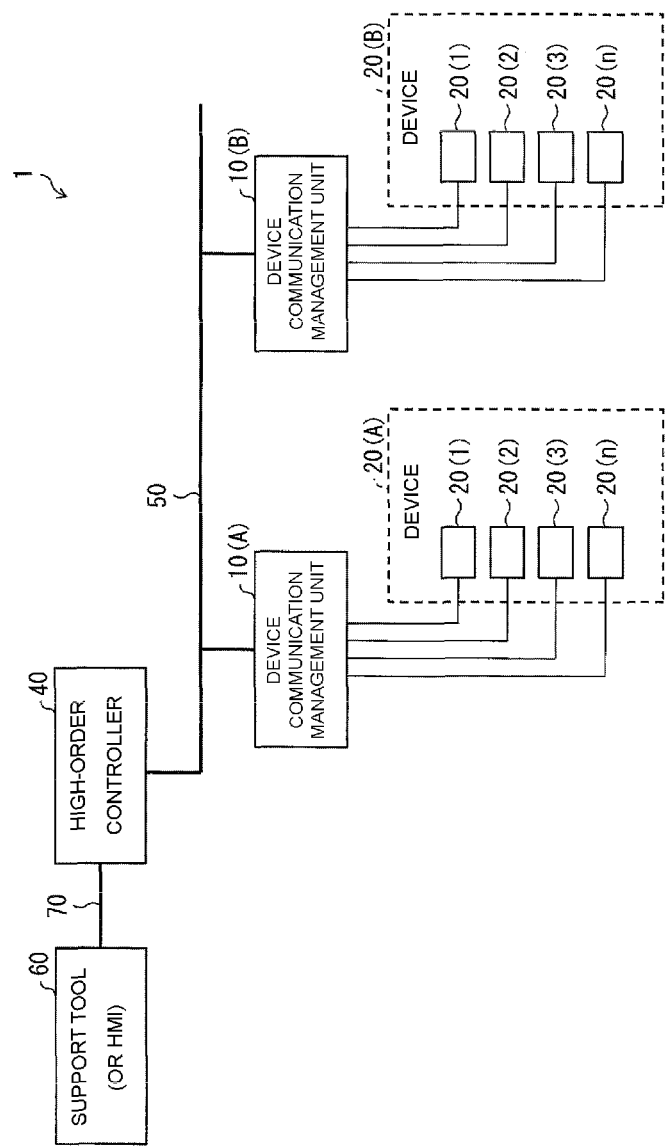
FIG. 2 is a diagram illustrating an overall outline of a control system 1 according to the embodiment.

FIG. 2 is a diagram illustrating an outline of the control system 1 including the device communication management units 10. As illustrated in FIG. 2, the control system 1 includes a high-order controller 40 and one or more device communication management units 10 that are connected to the high-order controller 40 via a field network 50 (a high-order bus, that is, a high-order communication network). In the example illustrated in FIG. 2, a device communication management unit 10(A) and a device communication management unit 10(B) are connected to the high-order controller 40 via the field network 50. In addition, the device communication management unit 10(A) and the device communication management unit 10(B) will be simply referred to as a "device communication management units 10" in a case in which it is not necessary to particularly distinguish therebetween in the following description.

The control system 1 is a master/slave control system that includes the high-order controller 40 that serves as a master device and one or more device communication management units 10 that are connected to the master device via a network (field network 50) and serve as slave devices. The high-order controller 40 is called a "master device" with the meaning that the high-order controller 40 manages data delivery via the field network 50. Meanwhile, the device communication management units 10 are called "slave devices".

In the control system 1, one or more devices 20 are connected to the device communication management units 10 via device communication cables 30. In the example illustrated in FIG. 2, the respective devices 20(1) to 20(n) are connected to the device communication management units 10 via device communication cables 30(1) to 30(n). For example, device 20(A) including at least one of the devices 20(1) to 20(n) is connected to the device communication management units 10(A), and device 20(B) including at least one of the devices 20(1) to 20(n) is connected to the device communication management units 10(B). In addition, the devices 20(1) to 20(n) will be simply referred to as "devices 20" in a case in which it is not particularly necessary to distinguish between the respective devices 20(1) to 20(n) (or devices 20(A) and 20(B)) in the following description. Similarly, the device communication cables 30(1) to 30(n) will be simply referred to as "device communication cables 30" in a case in which it is not particularly necessary to distinguish between the respective device communication cables 30(1) to 30(n). In addition, "n" is assumed to be an integer that is equal to or greater than 1, and "m" is assumed to be an integer that is equal to or greater than "1" and equal to or less than "n" in the embodiment.

The high-order controller 40 is a programmable logic controller (PLC), for example, and is a master device that manages data delivery via the field network 50 in the control system 1. The slave devices connected to the high-order controller 40 that serves as the master device can include a servo driver (not illustrated) and the like that is directly connected to the field network 50 in addition to the device communication management units 10. Further, in a case in which a plurality of high-order controllers 40 are connected to the field network 50, any one of the high-order controllers 40 serves as a master device while the other high-order controllers 40 serve as slave devices in some cases. Further, a control subject that is different from both the high-order controller 40 and the device communication management units 10 may alternatively serve as a master device. That is, the "master device" and the "slave devices" are defined by focusing on a control function of data transmission through the field network 50, and there is no particular limitation regarding what kind of information is to be transmitted and received between the respective devices.

The high-order controller 40 performs overall control of the control system 1. Specifically, the high-order controller 40 acquires, as input data, information from a device 20 as an input device such as a sensor and executes computation processing by using such acquired input data in accordance with a user program incorporated in advance. Then, the high-order controller 40 executes the computation processing, decides details of control performed on a device 20 that serves as an output device such as an actuator, and outputs control data (output data) corresponding to the details of control to the device 20.

The field network 50 delivers various kinds of data that is received by the high-order controller 40 or transmitted by the high-order controller 40, and is EtherCAT (registered trademark), PROFINET (registered trademark), MECHATROLINK (registered trademark)-III, Power link, SERCOS (registered trademark)-III, or CIP Motion, for example. Alternatively, the field network 50 may be, for example, EtherNet/IP (registered trademark), DeviceNet, CompoNet (registered trademark), or the like.

In addition, the control system 1 in which data is transmitted and received between the high-order controller 40 and the device communication management units 10 or between the device communication management unit 10(A) and the device communication management unit 10(B) by sequentially transferring data frames through the field network 50 will be described below. In addition, the field network 50 will be called a "high-order bus (high-order communication network)" in some cases for comparison with communication via the device communication cable 30 that serves as a low-order communication network, in the following description. Further, data frames on the field network 50 will also be referred to as "high-order data frames" to distinguish the data frames from data frames that propagate through the device communication cable 30.

As illustrated in FIG. 2, a support tool 60 may also be connected to the high-order controller 40 via a communication cable 70 that is a universal serial bus (USB) cable, for example.

The support tool 60 is an information processing apparatus for setting various parameters for the control system 1. For example, a timing at which a state value is acquired (input refresh) and a timing at which an output value is updated (output refresh) may be calculated and set by the support tool 60. The support tool 60 typically includes a general-purpose computer. For example, an information processing program executed by the support tool 60 may be stored and distributed in a compact disk-read only memory (CD-ROM), which is not illustrated in the drawing. The program stored in the CD-ROM is read by a CD-ROM drive device, which is not illustrated, and is then stored in a hard disk or the like of the support tool 60. Alternatively, the program may be downloaded through a network from a high-order host computer or the like.

A human machine interface (HMI) may be connected to the high-order controller 40 via the communication cable 70 instead of the support tool 60. The human machine interface (HMI) is means for exchanging information between a human and a machine, and specifically is means for allowing the human to operate the machine (providing an instruction to the machine) or allowing the machine to tell the human a current state and a result. For the HMI, the means for the human to provide an instruction to the machine includes a switch, a button, a handle, a dial, a pedal, a remote controller, a microphone, a keyboard, a mouse, and the like while the means for the machine to provide information related to the current state, the result, and the like to the human includes a liquid crystal screen, a meter, a lamp, a speaker, and the like.

The device communication management units 10 are slave devices connected to the high-order controller 40 that serves as a master device via a network (field network 50) in the control system 1 that serves as a master/slave control system.

That is, the device communication management units 10 control communication between the high-order controller 40 (field network 50) and the devices 20. For example, the device communication management units 10 transmit sensing information detected by a device 20 that serves as an input device, such as a sensor, connected to a device communication management unit 10 to the high-order controller 40 via the field network 50. Then, the high-order controller 40 executes a user program on the basis of the acquired sensing information and transmits an execution result thereof as a control command signal to the device communication management units 10 via the field network 50. The device communication management units 10 output the control command received via the field network 50 to an output device (a device 20 such as an actuator) to be operated.

The device communication management units 10 include high-order communication ports 120 to which transmission cables for communication with the high-order controller 40 via the field network 50 are connected. The device communication management units 10 also include one or more device communication ports 110(1) to 110(n) to which device communication cables 30(1) to 30(n) for communication with each of one or more devices 20(1) to 20(n) are connected. In addition, the device communication ports 110(1) to 110(n) will be simply referred to as "device communication ports 110" in a case in which it is not necessary to particularly distinguish between the respective device communication ports 110(1) to 110(n) in the following description.

The device communication management units 10 perform processing related to data delivery in the field network 50 and also control transmission and reception (input and output) of data to and from the devices 20. In particular, the device communication management units 10 perform transmission and reception (input and output) of data in any of the following two communication modes in accordance with types of the respective devices 20(1) to 20(n) for the respective device communication ports 110(1) to 110(n).

That is, in a case in which a device 20 to be connected to a device communication port 110 is a device 20 (S) that is a prior art standard device, the device communication management units 10 communicate with the device 20(S) in an SIO mode. The "SIO mode (standard I/O mode)" is a "mode in which only ON/OFF information (I/O signal) is transmitted and received".

In addition, in a case in which a device 20 to be connected to a device communication port 110 is a device 20(C) that is an intelligent device (specifically, one able to communicate), the device communication management units 10 communicate with the device 20(C) in a COM mode. The "COM mode (communication mode)" is a "mode in which analog information is transmitted and received in addition to the ON/OFF information".

For example, the device communication management units 10 can communicate with each of the devices 20(1) and 20(2) in the COM mode and communicate with each of the devices 20(3) and 20(4) in the SIO mode. That is, the device communication management units 10 can communicate with each of the device communication ports 110(1) to 110(n) either in the COM mode or in the SIO mode.

(Data to be Transmitted and Received in SIO Mode)

The device communication management units 10 transmit and receive (input and output) only binary data to and from the device 20(S) in a case in which communication is performed in the SIO mode. Specifically, the device communication management units 10 can collect (receive) information and the like indicating that the device 20(S) that is a sensor, for example, has detected (ON) some object or has not detected (OFF) some object. That is, the device communication management units 10 receive ON/OFF information from the device 20(S). In addition, the device communication management units 10 can output (transmit) a command of activating (ON) or deactivating (OFF) the device 20(S) that is a predetermined output target (for example, an actuator or the like). That is, the device communication management units 10 transmit the ON/OFF information to the device 20(S).

(Data to be Transmitted and Received in COM Mode)

The device communication management units 10 can transmit and receive (input and output) analog information in addition to the aforementioned binary data (ON/OFF information) to and from the device 20(C) in a case in which communication is performed in the COM mode. The device communication management units 10 can acquire communication properties, device parameters, identification data (identification information), and the like of the device 20(C) as the analog information from the device 20(C) by communicating in the COM mode. In addition, signals (the ON/OFF information and the analog information) output from the device 20(C) have different data sizes depending on a manufacturer, a type, and the like of the device 20(C), and have different storage positions of the ON/OFF information.

The devices 20 are input devices such as sensors, for example, or output devices such as actuators. The actuators convert an input to physical motion and perform active operation or drive.

In the control system 1, each of the devices 20 is the device 20(S) or the device 20(C). The device 20(S) communicates with the device communication management units 10 in the SIO mode in which "only the ON/OFF information is transmitted and received". The device 20(C) communicates with the device communication management units 10 in the COM mode in which "the ON/OFF information and the analog information are transmitted and received".

(Concerning Device Communication Management Units)

Outlines of the control system 1 and devices included in the control system 1 (the device communication management units 10, the devices 20, the high-order controller 40, and the support tool 60) have been described above with reference to FIG. 2. Next, a configuration, processing details, and the like of the device communication management units 10 included in the control system 1 will be described with reference to FIG. 1 and the like. Before describing details of the device communication management units 10 with reference to FIG. 1, an outline of the device communication management unit 10 will be summarized as follows for easy understanding of the device communication management units 10.

(Outline of Device Communication Management Unit)

The device communication management units 10 (slave devices) are slave devices that are connected to the high-order controller 40 (controller) that serves as a master device and include device communication ports 110 (communication ports) to which devices 20 are connected, and each includes an output data generation unit 105 (data generation unit) that generates IO-Link data D1 (first data) that is data including the ON/OFF information and the analog information from the devices 20 and a copy processing unit 106 (duplication unit) that generates digital input data D2 (second data) that is data storing only the ON/OFF information and to be delivered to the high-order controller 40 from the IO-Link data D1 in accordance with the copy setting information table 141 (setting information set by the user). Then, the copy setting information table 141 associates a storage position of the ON/OFF information in the IO-Link data D1 with a storage position of the ON/OFF information in the digital input data D2.

Although details will be described later, the copy processing unit 106 executes the following processing on a device communication port 110, for which the "copy method=IO-Link data" has been set, with reference to the copy setting information table 141. That is, the copy processing unit 106 generates the digital input data D2 from the IO-Link data D1 ($n$) storing the ON/OFF information that has been received from a device communication port 110($n$), for which the "copy method=IO-Link data" has been set.

According to the above configuration, the device communication management units 10 generate the digital input data D2 that stores only the ON/OFF information and is to be delivered to the high-order controller 40 from the IO-Link data D1 including the ON/OFF information and the analog information from the device 20 in accordance with the copy setting information table 141 set by the user.

Here, the high-order controller 40 executes various kinds of control processing by utilizing the ON/OFF information from the devices 20. In addition, the position where the ON/OFF information is stored in the data output by the devices 20 and the position where the ON/OFF information is stored in the IO-Link data D1 vary for the respective devices 20.

In contrast, the ON/OFF information from the devices 20 is stored at a predetermined position in the digital input data D2 in accordance with the copy setting information table 141 set by the user.

Then, the high-order controller 40 can utilize the digital input data D2 in which the ON/OFF information from the devices 20 are stored at the predetermined position in accordance with the copy setting information table 141 for executing various kinds of control processing utilizing the ON/OFF information from the devices 20.

Even in a case in which the devices 20 are exchanged, for example, the device communication management units 10 can cause the high-order controller 40 to execute the control processing merely by changing the copy setting information table 141 in accordance with the devices 20 after the exchange without changing the program of the high-order controller 40 that refers to the ON/OFF information. That is, the device communication management units 10 can cause the high-order controller 40 to execute the control processing by utilizing the ON/OFF information stored at the predetermined position in the digital input data D2 in accordance with the copy setting information table 141 set by the user.

Therefore, the device communication management units 10 have an effect that the program of the high-order controller 40 that refers to the ON/OFF information is made to be independent from the devices 20, for example, to facilitate recovery of the high-order controller 40 from the exchange or the like of the device 20 and the time required for the recovery can be shortened. That is, the device communication management units 10 have an effect that it is possible to easily exchange the devices 20 without changing the program or the like of the high-order controller 40 that refers to the ON/OFF information from the devices 20 connected to the device communication management units 10.

The device communication management units 10 include a plurality of device communication ports 110(1) to 110($n$), and the copy setting information table 141 associates the storage position of the ON/OFF information in the IO-Link data D1 with the storage position of the ON/OFF information in the digital input data D2 for each of the device communication ports 110.

That is, the ON/OFF information from each of the devices 20(1) to 20($n$) connected to each of the plurality of device communication ports 110(1) to 110($n$) is stored at the predetermined position in the digital input data D2 in accordance with the copy setting information table 141 set by the user for each of the device communication ports 110. Then, the high-order controller 40 can execute the control processing by utilizing the digital input data D2 in which the ON/OFF information from each of the devices 20(1) to 20(n) is stored at the predetermined position in accordance with the copy setting information table 141.

Therefore, the device communication management units 10 have an effect that it is possible to easily exchange each of the devices 20(1) to 20(n) without changing the program or the like of the high-order controller 40 that refers to the ON/OFF information from each of the devices 20(1) to 20(n) connected to the device communication management units 10.

Each device communication management unit 10 includes a storage unit 140 that stores the copy setting information table 141. According to the above configuration, each device communication management unit 10 includes the storage unit 140 that stores the copy setting information table 141 that is information set by the user and associating the storage position of the ON/OFF information in the IO-Link data D1 with the storage position of the ON/OFF information in the digital input data D2.

That is, each device communication management unit 10 generates the digital input data D2 that stores only the ON/OFF information from the IO-Link data D1 in accordance with the copy setting information table 141 stored in the storage unit 140 of the device communication management unit 10 itself. Therefore, each device communication management unit 10 has an effect that it is possible to facilitate the recovery of the high-order controller 40 from the exchange or the like of the device 20 without acquiring the copy setting information table 141 from an external device, such as the high-order controller 40, and to shorten the time required for the recovery. That is, the device communication management units 10 have an effect that it is possible to easily exchange the devices 20 without acquiring the copy setting information table 141 from the external device, such as the high-order controller 40, and without changing the program or the like of the high-order controller 40.

Each device communication management unit 10 includes an operation receiving unit 104 that receives a user's operation of setting or changing the copy setting information table 141. According to the above configuration, the device communication management units 10 generate the digital input data D2 that stores only the ON/OFF information from the IO-Link data D1 in accordance with the copy setting information table 141 set or changed by the user's operation received by the operation receiving unit 104.

Even in a case in which the devices 20 are exchanged, for example, the device communication management units 10 can cause the high-order controller 40 to execute the control processing merely by changing the copy setting information table 141 according to the user's operation received by the operation receiving unit 104 in accordance with the exchange of the devices 20.

Therefore, the device communication management units 10 have an effect that it is possible to facilitate the recovery of the high-order controller 40 from the exchange or the like of the device 20 merely by setting or changing the copy setting information table 141 according to the user's operation received by the operation receiving unit 104 and to shorten the time required for the recovery. That is, the device communication management units 10 have an effect that it is possible to easily exchange the devices 20 without changing the program or the like of the high-order controller 40, by utilizing the copy setting information table 141 set or changed by the user.

(Details of Device Communication Management Units)

As to the device communication management units 10 briefly described above, details of the configuration of the device communication management units 10 will be described next with reference to FIG. 1.

FIG. 1 is a block diagram illustrating configurations of main parts of each device communication management unit 10. The device communication management unit 10 illustrated in FIG. 1 has a configuration including a device communication control unit 100, the device communication ports 110, the high-order communication port 120, a high-order communication control unit 130, and a storage unit 140. In addition, configurations that do not have a direct relationship with the embodiment are omitted in the illustration and the block diagram for securing simple description. However, the device communication management unit 10 may include the omitted components in accordance with an actual situation of realization.

(Functional Parts Other than Storage Unit)

The device communication ports 110 are interfaces to which the communication cables for communication with the devices 20 via the device communication cables 30 are connected. The high-order communication port 120 is an interface to which the transmission cable for communication with the high-order controller 40 via the field network 50 is connected.

The high-order communication control unit 130 comprehensively controls the communication with the high-order controller 40 via the field network 50. The high-order communication control unit 130 includes a field bus control unit 131, a high-order communication reception processing unit 132, and a high-order communication transmission processing unit 133.

The field bus control unit 131 manages data delivery via the field network 50. The high-order communication reception processing unit 132 receives a high-order communication frame transmitted from the high-order controller 40 via the field network 50, decodes the high-order communication frame into data, and then outputs the data to the field bus control unit 131. The high-order communication transmission processing unit 133 regenerates the high-order communication frame from the data output from the field bus control unit 131 and retransmits (forwards) the high-order communication frame via the field network 50. The field bus control unit 131 cooperates with the high-order communication reception processing unit 132 and the high-order communication transmission processing unit 133 and transmits and receives data to and from the high-order controller 40 at every control cycle determined in advance via the field network 50.

The device communication control unit 100 is designed to comprehensively control the functions of the device communication management units 10 related to the communication with the devices 20. The device communication control unit 100 illustrated in the drawing includes, as functional blocks, a device communication processing unit 101, a device communication reception processing unit 102, a device communication transmission processing unit 103, an operation receiving unit 104, an output data generation unit 105, and a copy processing unit 106.

The device communication processing unit 101 controls communication with the devices 20 and includes the device communication reception processing unit 102 and the device communication transmission processing unit 103. The device communication processing unit 101 executes the following two functions (A) and (B).

(A) If a device 20 is connected to a device communication port 110, the device communication processing unit 101 outputs the following signal to the connected device 20. That is, the device communication processing unit 101 outputs a signal (a Wake-up request that is a current pulse of 80 μs and 0.5 A, for example) for an inquiry about "which of the device 20(S) and the device 20(C) the device itself (device 20) is". Then, the device communication processing unit 101 receives a signal indicating a response to "which of the device 20(S) and the device 20(C) the device itself (device 20) is" from the device 20 that has received the signal (WURQ). The device communication processing unit 101 determines "which of the device 20(S) and the device 20(C)" the device 20 connected to the device communication port 110 is, by receiving the signal indicating the response.

(B) The device communication processing unit 101 communicates with the device 20 in the SIO mode or the COM mode on the basis of the determination result about "which of the device 20(S) and the device 20(C)" the device 20 connected to the device communication port 110 is. Specifically, if the device 20 connected to the device communication port 110 is determined to be the "device 20(S)", the device communication processing unit 101 communicates with the device 20 in the SIO mode. Also, if the device 20 connected to the device communication port 110 is determined to be the "device 20(C)", the device communication processing unit 101 communicates with the device 20 in the COM mode.

The device communication reception processing unit 102 receives information (signals) output from the devices 20(1) to 20(n) via the device communication cable 30 from the respective device communication ports 110(1) to 110(n).

In a case in which the device 20 is the device 20(S), the signal output from the device 20 is ON/OFF information (for example, ON/OFF information indicating that the device 20 as a sensor has detected (ON) or has not detected (OFF) some object). The device communication reception processing unit 102 receives only the ON/OFF information in a case of communicating with the device 20(S) in the SIO mode.

In a case in which the device 20 is the device 20(C), the signal output from the device 20 includes analog information related to communication properties, device parameters, identification data (identification information), and the like of the device 20 in addition to the ON/OFF information. The device communication reception processing unit 102 receives the ON/OFF information and the analog information in the case of communicating with the device 20(C) in the COM mode. The analog information received when the device communication reception processing unit 102 communicates with the device 20(C) in the COM mode includes the identification information of the device 20(C).

The device communication transmission processing unit 103 transmits a control command or the like from the high-order controller 40 to the devices 20(1) to 20(n) via the device communication cable 30 from the respective device communication ports 110(1) to 110(n).

In a case in which the device 20 is the device 20(S), the signal transmitted to the device 20 is ON/OFF information (for example, a command of activating (ON) or inactivating (OFF) the device 20 that is an actuator). The device communication transmission processing unit 103 transmits only the ON/OFF information in a case of communicating with the device 20(S) in the SIO mode.

In a case in which the device 20 is the device 20(C), the signal transmitted to the device 20 includes analog information related to other control and the like performed on the device 20, in addition to the ON/OFF information. The device communication transmission processing unit 103 transmits the ON/OFF information and the analog information in a case of communicating with the device 20(C) in the COM mode.

The operation receiving unit 104 receives a user's operation performed on the copy information setting screen via the high-order communication control unit 130 and stores information corresponding to the received user's operation in the copy setting information table 141. In other words, the operation receiving unit 104 receives the user's operation of setting or changing information to be stored in the copy setting information table 141 via the high-order communication control unit 130.

The output data generation unit 105 stores information (signals) output from the devices 20(1) to 20(n) at predetermined positions in a predetermined data format and generates IO-Link data D1 that is data to be transmitted to the high-order controller 40. The output data generation unit 105 generates IO-Link data D1(n) from "the signal including the ON/OFF information and the analog information" output from the device 20(n) that is the device 20(C). In other words, the IO-Link data D1(n) stores "the ON/OFF information and the analog information" output from each device 20(n).

In addition, the data size of the signal (the ON/OFF information and the analog information) output from the device 20(C) and the storage position of the ON/OFF information vary depending on a manufacturer, a type, and the like of the device 20(C). Therefore, the date size of the IO-Link data D1 storing the signal output from the device 20(C) and the storage position of the ON/OFF information also vary depending on the manufacturer, the type, and the like of the device 20(C).

The copy processing unit 106 generates the digital input data D2 storing only the ON/OFF information from the devices 20(1) to 20(n) with reference to the copy setting information table 141. For example, the copy processing unit 106 generates the digital input data D2 by the following method (A) or (B).

(A) For a device communication port 110 for which the "copy method=PIN2/SIO" has been set in the copy setting information table 141, the copy processing unit 106 stores the ON/OFF information received by the device communication port 110 in the digital input data D2.

(B) For a device communication port 110 for which the "copy method=IO-Link data" has been set in the copy setting information table 141, the copy processing unit 106 generates the digital input data D2 from the IO-Link data D1. Specifically, the copy processing unit 106 copies the signal stored at the predetermined position in the IO-Link data D1(n) of signal received by the device communication port 110(n), for which the "copy method=IO-Link data" has been set, to a predetermined position in the digital input data D2. The information indicating "the predetermined position in the IO-Link data D1(n)" as a copy source and the information indicating "the predetermined position in the digital input data D2" as a copy destination are associated with the device communication port 110(n) and are stored in the copy setting information table 141.

Here, what kind of information (signals) and at which pin number of the device communication port 110 the device communication reception processing unit 102 receives will be described with reference to FIG. 3 for easy understanding of the copy setting information table 141.

(Signals Transmitted and Received by Device Communication Port at Each Pin)

Figure 3:
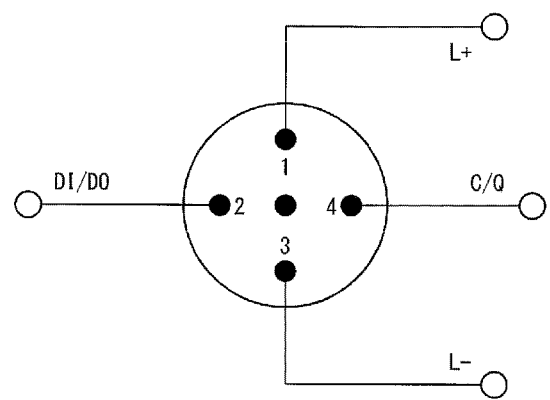
FIG. 3 is a diagram illustrating an example regarding what kind of signal and at which pin number the device communication management unit in FIG. 1 transmits and receives.

FIG. 3 is a diagram illustrating an example regarding what kind of signals and at which pin number in the device communication port 110 the device communication reception processing unit 102 transmits and receives. In a case in which the device 20 connected to the device communication port 110 is the device 20(C), the device communication reception processing unit 102 transmits and receives "the ON/OFF information and the analog information from the device 20" at the fourth pin in the device communication port 110. Also, in a case in which the device 20 connected to the device communication port 110 is the device 20(C), the device communication reception processing unit 102 transmits and receives "only the ON/OFF information from the device 20" at the second pin in the device communication port 110. Since "only the ON/OFF information" is transmitted and received at the second pin, it is possible to increase the communication speed of the communication at the second pin as compared with the communication at the fourth pin for transmitting and receiving "the ON/OFF information and the analog information".

In a case in which the device 20 connected to the device communication port 110 is the device 20(S), the device communication reception processing unit 102 transmits and receives "the ON/OFF information from the device 20" at the fourth pin in the device communication port 110. Also, in a case in which the device 20 connected to the device communication port 110 is the device 20(S), the device communication reception processing unit 102 may also transmit or receive "the ON/OFF information from the device 20" at the second pin in the device communication port 110.

(Storage Unit)

The storage unit 140 stores various kinds of data to be used by the device communication management unit 10. That is, the storage unit 140 stores (1) a control program, (2) an OS program, and (3) an application program for executing various functions executed by the device communication management unit 10 and (4) various kinds of data to be read when the application program is executed. The aforementioned data (1) to (4) is stored in a nonvolatile storage device such as a read only memory (ROM), a flash memory, an erasable programmable ROM (EPROM), an electrically EPROM (EEPROM) (registered trademark), or a hard disc drive (HDD), for example. In addition, the storage unit 140 stores the copy setting information table 141.

The copy setting information table 141 stores information for setting a "copy method", a "From bit position of reception data (copy source)", and "To bit position of copy destination" for each of the device communication ports 110(1) to 110($n$). In addition, the "From bit position of reception data (copy source)" will be abbreviated as a "From position", and the "To bit position of copy destination" will be abbreviated as a "To position" in the following description in order to exclude redundancy of the description.

FIG. 4 is a diagram illustrating an example of a data structure of the copy setting information table 141. The copy setting information table 141 stores a "copy method" for each of the device communication ports 110(1) to 110($n$), and specifically, stores "PIN2/SIO" or "IO-Link data" as the "copy method".

The "copy method" is information for providing an instruction about a method of generating the digital input data D2 corresponding to the signal (specifically, the ON/OFF information) received by each of the device communication ports 110(1) to 110($n$) to the copy processing unit 106.

(Copy Method=PIN2/SIO)

For a device communication port 110 for which the "copy method=PIN2/SIO" has been set, the copy processing unit 106 generates the digital input data D2 directly from the ON/OFF information received by the device communication port 110. Specifically, the copy processing unit 106 stores the signal (ON/OFF information) received by the device communication port 110 in the digital input data D2 by the following method (A) or (B).

(A) In a case in which the device 20 connected to a device communication port 110, for which "PIN2/SIO" has been selected, is the device 20(C), the ON/OFF information received at the second pin (PIN2) in the device communication port 110 is directly stored in the digital input data D2. In a case in which the device 20 connected to the device communication port 110, for which "PIN2/SIO" has been set, is the device 20(C), the copy processing unit 106 directly stores the signal received at the PIN2 in the device communication port 110 in the digital input data D2.

(B) In a case in which the device 20 connected to the device communication port 110, for which "PIN2/SIO" has been selected, is the device 20(S), the ON/OFF information received at the fourth pin in the device communication port 110 is directly stored in the digital input data D2. In a case in which the device 20 connected to the device communication port 110, for which "PIN2/SIO" has been selected, is the device 20(S), the copy processing unit 106 directly stores the signal received by the device communication port 110 in the SIO mode in the digital input data D2.

The "To position" of the device communication port 110($n$), for which the "copy method=PIN2/SIO" has been set, is fixed to Bit "$n-1$" with reference to the copy setting information table 141. In other words, the "To position" of the device communication port 110($n$), for which the "copy method=PIN2/SIO" has been set, is not particularly designated in the copy setting information table 141. The copy processing unit 106 stores the signal (ON/OFF information) received by the device communication port 110($n$) for which the "copy method=PIN2/SIO" has been set at the position of the Bit "$n-1$" in the digital input data D2.

(Copy Method=IO-Link Data)

For the device communication port 110 for which the "copy method=IO-Link data" has been set, the copy processing unit 106 generates the digital input data D2 from the IO-Link data D1 that stores the ON/OFF information received by the device communication port 110.

Here, the "From position" and the "To position" are stored for each of the device communication ports 110(1) to 110($n$) for which the "copy method=IO-Link data" has been set in the copy setting information table 141.

The "From position" is information indicating an acquisition source (copy source) of "a signal (ON/OFF information) that the copy processing unit 106 stores in the digital input data D2". In a case in which the "From position=P" has been set for a device communication port 110($m$), the copy processing unit 106 copies a signal at the "Bit position=P" in the IO-Link data D1($m$) that stores the signal (information) received by the device communication port 110($m$).

The "To position" is information indicating the Bit position (the storage position or the copy destination) in the digital input data D2, at which the copy processing unit 106 stores "the signal copied from the copy source designated by the From position". In addition, the "To position" is also information indicating the bit position (storage position), where the copy processing unit 106 stores the signal received by the device communication port 110(*n*), for which the "copy method=PIN2/SIO" has been set, in the digital input data D2. In a case in which the "To position=Q" has been set for the device communication port 110(*m*), the copy processing unit 106 stores "the signal copied from the copy source designated by the From position" at the "Bit position=Q" in the digital input data D2.

In a case in which the "From position=P" and the "To position=Q" have been set for the device communication port 110(*n*), for which the "copy method=IO-Link data" has been set, the copy processing unit 106 executes the following processing. That is, the copy processing unit 106 copies the signal at the 'Bit position=P" in the IO-Link data D1(*n*) that stores the signal (information) received by the device communication port 110(*n*) and stores the copied value at the "Bit position=Q" in the digital input data D2.

The "To position" of the device communication port 110(*n*) may be fixed to the Bit "n–1", or the Bit "n–1" may be set as an initial setting value of the "To position" in the copy setting information table 141. In other words, the "To position" may not be particularly designated for each device communication port 110 in the copy setting information table 141. The copy processing unit 106 copies a signal at a predetermined position in the IO-Link data D1(N) for the device communication port 110(*n*), for which the "copy method=IO-Link data" has been set, and stores the copied value at the position of the Bit "n–1" in the digital input data D2.

(Specific Content in FIG. 4)

In the copy setting information table 141 illustrated in FIG. 4, "PIN2/SIO" has been set for the device communication ports 110(3) and 110(4). In a case in which the device 20(3) connected to the device communication port 110(3) is the device 20(C), the copy processing unit 106 stores a signal (ON/OFF information), which has been received at the second pin of the device communication port 11(3), at Bit 2 in the digital input data D2. In a case in which the device 20(3) connected to the device communication port 110(3) is the device 20(S), the copy processing unit 106 stores a signal (ON/OFF information), which has been received at the fourth pin of the device communication port 110(3), at Bit 2 in the digital input data D2.

Similarly, in a case in which the device 20(4) is the device 20(C), the copy processing unit 106 stores a signal, which has been received at the second pin of the device communication port 110(4), at Bit 3 in the digital input data D2. In a case in which the device 20(4) is the device 20(S), the copy processing unit 106 stores the signal, which has been received at the fourth pin of the device communication port 110(4), at Bit 3 in the digital input data D2.

In the copy setting information table 141 illustrated in FIG. 4, the "copy method=IO-Link data" has been set for the device communication ports 110(1), 110(2), and 110(*n*). In addition, the "From position=14" and the "To position=0" have been set for the device communication port 110(1) in the copy setting information table 141 illustrated in FIG. 4. Further, the "From position=7" and the "To position=1" have been set for the device communication port 110(2), and the "From position=0" and the "To position=n–1" have been set for the device communication port 110(*n*).

Therefore, the copy processing unit 106 generates the digital input data D2 from the IO-Link data D1(1), D1(2), and D1(*n*) that stores the signals output from the respective devices 20(1), 20(2), and 20(*n*).

Specifically, the copy processing unit 106 copies the signal at the position of Bit 14 in the IO-Link data D1(1) and stores the copied value at the position of Bit 0 in the digital input data D2. The copy processing unit 106 copies the signal at the position of Bit 7 in the IO-Link data D1(2) and stores the copied value at the position of Bit 1 in the digital input data D2. The copy processing unit 106 copies the signal at the position of Bit 0 in the IO-Link data D1(*n*) and stores the copied value at the position of the Bit "n–1" in the digital input data D2.

In addition, it is not possible to connect the device 20(S) to the device communication port 110, for which the "copy method=IO-Link data" has been set, in the copy setting information table 141. In a case in which it is detected that the device 20(S) has been connected to the device communication port 110, for which the "copy method=IO-Link data" has been set, in the copy setting information table 141, the device communication management unit 10 may provide a notification thereof to the user and warn the user.

The information stored in the aforementioned copy setting information table 141 is information that is stored by the operation receiving unit 104 that has received a user's setting operation (change operation) on the copy information setting screen. Hereinafter, details of the copy information setting screen will be described with reference to FIG. 5.

(Concerning Setting of Copy Information)

Figure 5:
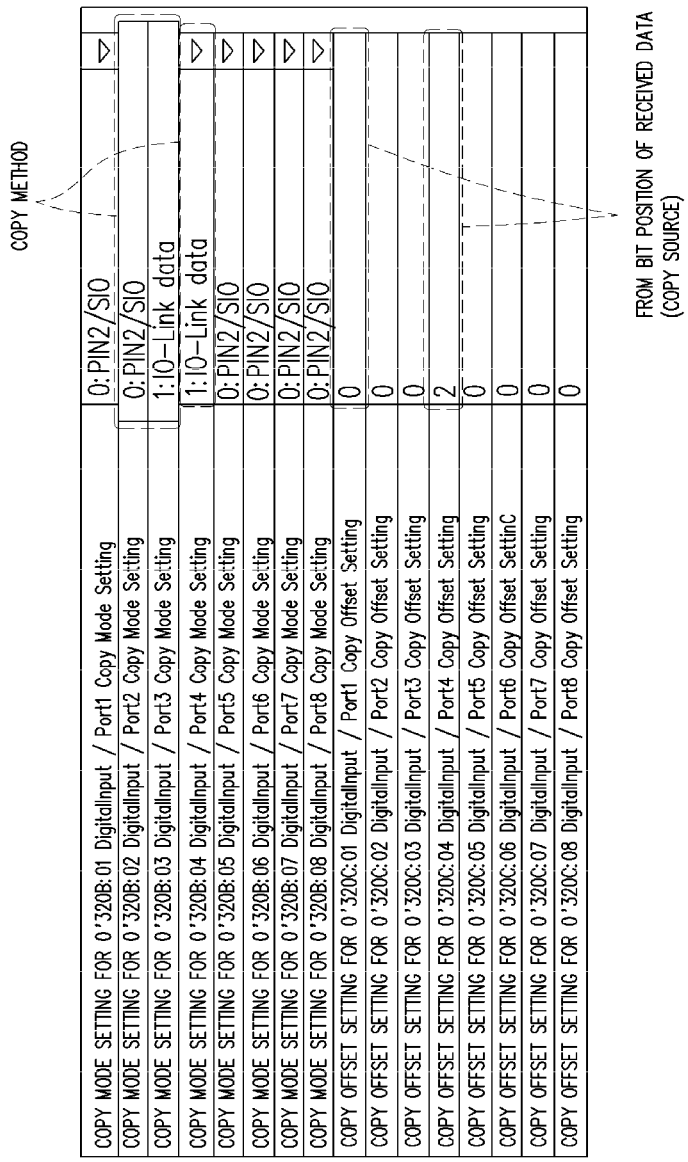
FIG. 5 is a diagram illustrating an example of a copy information setting screen.

FIG. 5 is a diagram illustrating an example of the copy information setting screen. On the copy information setting screen illustrated in FIG. 5, the user sets the copy setting information table 141 for designating a method of generating the digital input data D2 for each of the one or more device communication ports 110(1) to 110(*n*).

The copy information setting screen is displayed on the support tool 60 or the HMI, for example. The high-order controller 40, the support tool 60, or the HMI may cause the support tool 60 or the HMI to display the copy information setting screen, or the device communication management unit 10 may cause the support tool 60 or the HMI to display the copy information setting screen. That is, the device communication management unit 10 may include a display control unit, which is not illustrated in the drawings, and cause the support tool 60 or the HMI to display the copy information setting screen.

First, the user selects the "copy method (a method of generating the digital input data D2)" on the copy information setting screen for each of the one or more device communication ports 110(1) to 110(*n*). It is possible to select "PIN2/SIO" or "IO-Link data (copied from the IO-Link data D1)" as the "copy method".

(In Case in Which "Copy Method=PIN2/SIO" has been Selected)

The copy information setting screen illustrated in FIG. 5 shows that the following setting has been performed on the device communication port 110(1) (represented as "0x320B: 01" in FIG. 5). That is, the drawing shows that "0: PIN2/SIO" has been selected as the "copy method (represented as "copy mode setting of DigitalInput" in FIG. 5) from "0: PIN2/SIO" and "1: IO-Link data". That is, the drawing shows that a user's operation of selecting "PIN2/SIO" as the "copy method" related to the device communication port 110(1) has been performed.

In a case in which "PIN2/SIO" has been selected for a certain device communication port 110, information received from the device 20 that is connected to the device communication port 110 (specifically, ON/OFF information) is directly stored in the digital input data D2. In the example illustrated in FIG. 5, the copy processing unit 106 directly stores a signal received by the device communication port 110(1) (the ON/OFF information and the analog information) at the position of Bit 0 in the digital input data D2.

(In Case in Which "Copy Method=IO-Link Data" has been Selected)

The copy information setting screen illustrated in FIG. 5 shows that the following setting has been performed for the device communication port 110(4) (represented as "0x320B: 04" in FIG. 5). That is, the drawing shows that "1: IO-Link data" has been selected as "copy mode setting of DigitalInput" from "0: PIN2/SIO" and "1: IO-Link data". That is, the drawing shows that a user's operation of selecting "IO-Link data" as the "copy method" related to the device communication port 110(4) has been performed.

In a case in which "IO-Link data" has been selected as the "copy method" for a certain device communication port 110 on the copy information setting screen, the user further sets the "From position" and the "To position". On the copy information setting screen illustrated in FIG. 5, the following setting has been performed for "0x320B:04" (that is, the device communication port 110(4)), for which the "copy method=IO-Link data" has been selected. That is, "2" (that is, Bit 2) has been selected as the "offset setting" (that is, the From position) for the device communication port 110(4).

In addition, the "To position" of the device communication port 110(n) may be fixed to Bit "n−1", that is, the user may not set the "To position" in the copy setting information table 141 as described above. Since the "To position" of the device communication port 110(n) is fixed, the example illustrated in FIG. 5 does not show an item for the user to set the "To position" for each device communication port 110.

In a case in which the "copy method=IO-Link data" has been selected for a certain device communication port 110, the copy processing unit 106 generates the digital input data D2 from the IO-Link data D1 corresponding to the data received by the device communication port 110. Specifically, the copy processing unit 106 copies a signal (information) that is stored at the "From position" in the IO-Link data D1 and stores the signal at the "To position" in the digital input data D2.

In the example illustrated in FIG. 5, the copy processing unit 106 generates the digital input data D2 from the IO-Link data D1(4) corresponding to the signal (the ON/OFF information and the analog information) received by the device communication port 110(4). Specifically, the copy processing unit 106 copies the data stored at the position of Bit 2 in the IO-Link data D1(4) and stores the data at the position of Bit 3 in the digital input data D2.

In addition, the copy setting information table 141 may store the "copy method=PIN2/SIO" and the "From position=0" as initial setting values for all the device communication ports 110.

(Relation between Copy Information Setting Screen and Copy Setting Information Table)

The operation receiving unit 104 receives a user's operation on the copy information setting screen in FIG. 5 via the high-order communication control unit 130 and stores the following information in the copy setting information table 141. That is, the operation receiving unit 104 stores "PIN2/SIO" as the "copy method" for the device communication port 110(1) in the copy setting information table 141. In addition, the operation receiving unit 104 stores "IO-Link data" as the "copy method" for the device communication port 110(4) and stores "Bit 2" as the "From position" in the copy setting information table 141.

(Exchange of Device)

Figure 6:
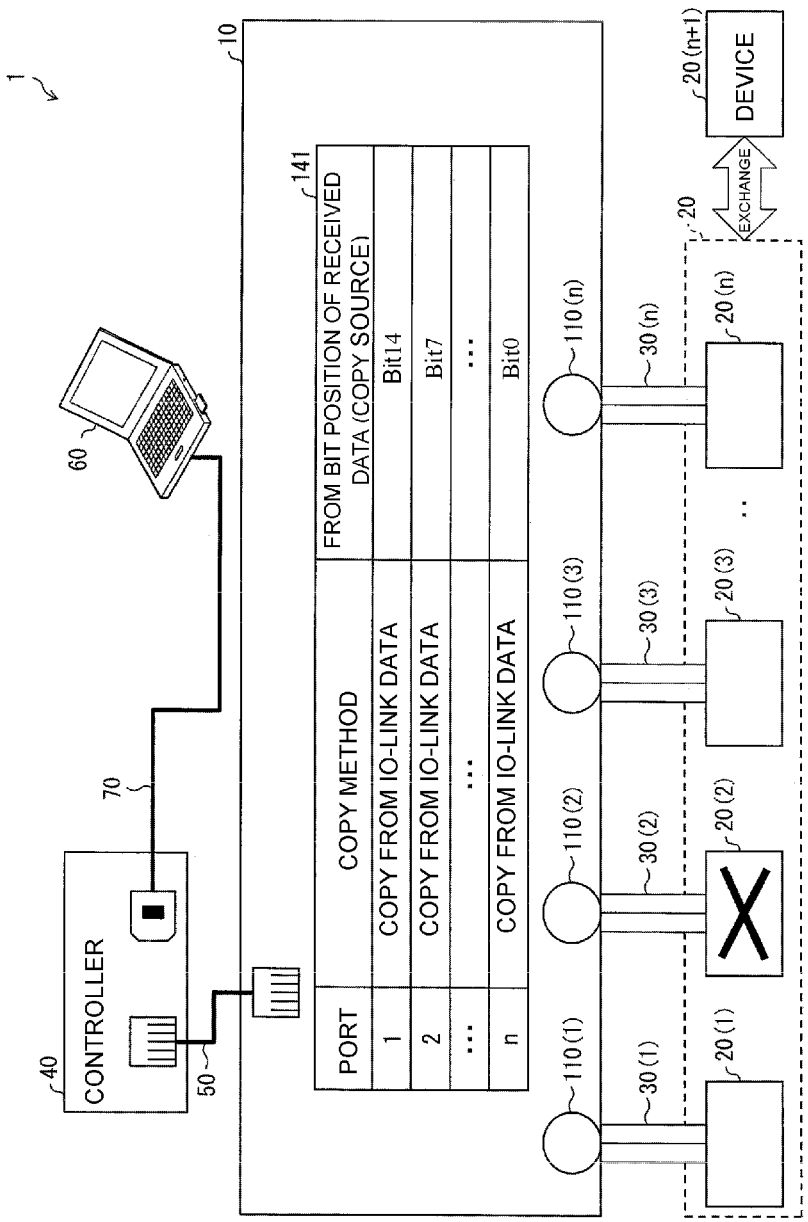
FIG. 6 is a diagram illustrating a situation in which a device to be connected to the device communication management unit is exchanged.

FIG. 6 is a diagram illustrating a situation in which a device 20 to be connected to the device communication port 110 of the device communication management unit 10 is exchanged in the control system 1. In the state before the exchange, the device 20(1) is connected to the device communication port 110(1) of the device communication management unit 10, the device 20(2) is connected to the device communication port 110(2), and the device 20(3) is connected to the device communication port 110(3).

In addition, the copy setting information table 141 of the device communication management unit 10 is the copy setting information table 141 illustrated as an example in FIG. 4 in the state before the exchange. Therefore, "IO-Link data" is stored as the "copy method" for the device communication port 110(2), and "Bit 7" is stored as the "From position" in the copy setting information table 141 before the exchange. In other words, the ON/OFF information output from the device 20(2) is stored at the position of Bit 7 in the IO-Link data D1(2) that stores the signal output from the device 20(2) connected to the device communication port 110(2).

In the state before the exchange, the copy processing unit 106 copies the signal at the position of Bit 7 in the IO-Link data D1(2) with reference to the copy setting information table 141 and stores the copied value to the position of Bit 1 in the digital input data D2.

The user exchanges the device 20(2) connected to the device communication port 110(2) with a device 20(n+1) as illustrated in FIG. 6. There is a case in which a device 20(n+1) such as a general-purpose sensor, a press button, or the like is connected to the device communication port 110(2) and is temporarily used instead of the device 20(2), for example, when the device 20(2) connected to the device communication port 110(2) is breakdown.

(Properties of Output Data from Device and Prior Art Operations at Time of Exchange)

Here, in a case in which the device 20(2) is the device 20(C), a data format of data output from the device 20(C) varies depending on a manufacturer of the device 20(C). In other words, the position at which "the ON/OFF information from the device 20(2)" is stored in the signal output from the device 20(2) and the position at which "the ON/OFF information from the device 20(n+1)" is stored in the signal output from the device 20(n+1) are not necessarily the same.

Therefore, in a case in which the device 20(2) is exchanged with the device 20(n+1) or the like, the following procedure is required in the related art in order for the high-order controller 40 to correctly execute the program that refers to the ON/OFF information received by the device communication port 110(2). That is, it is necessary for the user to change the program to be executed by the high-order controller 40 in accordance with the device 20(n+1) in the prior art. Then, in a case in which the user changes "the program to be executed by the high-order controller 40" such as a user program, it is necessary to determine a debug range, to perform debugging, and to confirm whether the high-order controller 40 executes desired processing in addition to estimating of a range of influences of the change. That is, in the case in which the device 20(2) is exchanged with the device 20(n+1), a series of procedure related to the change in the program to be executed by the high-order controller 40 is required until the recovery of the control system 1, and the recovery is not easily performed, such that it takes a long time to complete the recovery in the prior art.

(Simplification of Exchange Operation Utilizing Copy Setting Information Table)

In a case in which the ON/OFF information output from the device 20(n+1) is stored at the position of Bit "P" in the IO-Link data D1(n+1) that stores the signal output from the device 20(n+1), the user sets the following information on the copy information setting screen. That is, the user sets "P" as the "From position" for the device communication port 110(2) on the copy information setting screen.

The operation receiving unit 104 receives the aforementioned user's operation on the copy information setting screen via the high-order communication control unit 130 and stores the following information in the copy setting information table 141. That is, the operation receiving unit 104 stores "IO-Link data" as the "copy method" for the device communication port 110(2) and stores the "Bit 'P'" as the "From position" in the copy setting information table 141.

In the state after the exchange, the copy processing unit 106 copies the signal at the position of Bit "P" in the IO-Link data D1(n+1) with reference to the copy setting information table 141 and stores the copied value at the position of Bit 1 in the digital input data D2.

Therefore, the copy processing unit 106 stores the ON/OFF information received by the device communication port 110(2) at the position of Bit 1 in the digital input data D2 with no change before and after the exchange of the device 20 connected to the device communication port 110(2). In other words, the ON/OFF information that the device communication management unit 10 has received by the device communication port 110(2) is stored at the position of Bit 1 in the digital input data D2 with no change before and after the exchange of the device 20 connected to the device communication port 110(2).

The high-order controller 40 acquires the ON/OFF information, which the device communication management unit 10 has received by the device communication port 110(2), by receiving the digital input data D2 without depending on the device 20 connected to the device communication port 110(2). Specifically, the high-order controller 40 acquires the ON/OFF information, which has been received by the device communication port 110(2) with reference to the information stored at the position of Bit 1 in the digital input data D2, without depending on the connected device 20.

As described above, the device communication management unit 10 mounts a function of transferring an arbitrary bit of the IO-Link data D1 that stores the signal (the ON/OFF information and the analog information) received from the device 20 to the high-order controller 40. The device communication management unit 10 utilizes the copy setting information table 141 to execute the aforementioned transfer function. The copy setting information table 141 associates information of the "copy source" designating the "arbitrary bit" in the IO-Link data D1 with information of the "copy destination" in the digital input data D2 that stores the "arbitrary bit" to be transferred to the high-order controller 40, for each of the one or more device communication ports 110.

Therefore, the device communication management unit 10 can exchange the device 20(n) connected to the device communication port 110(n) without changing "the program to be executed by the high-order controller 40". The user can exchange the device 20 connected to the device communication management unit 10 and quickly recover the control system 1 merely by changing the content of the copy setting information table 141 without changing "the program to be executed by the high-order controller 40".

That is, since "the program to be executed by the high-order controller 40" is not changed in the case in which only the copy setting information table 141 is changed, it is not necessary to debug "the program to be executed by the high-order controller 40". Therefore, the procedure required for recovering the control system 1 when the device 20 is exchanged becomes simpler, and it is possible to more easily recover the control system 1 in a case in which only the copy setting information table 141 is changed.

In addition, although the signal (information) output from the device 20 varies depending on the device 20 connected to the device communication port 110, the device communication management unit 10 absorbs the difference of the signals output from the plurality of respective devices 20. Therefore, the user can unify "the program to be executed by the high-order controller 40" independently from the device 20 connected to the device communication port 110, by the device communication management unit 10.

(Signal Delivery Processing Executed by Device Communication Management Unit)

Figure 7:
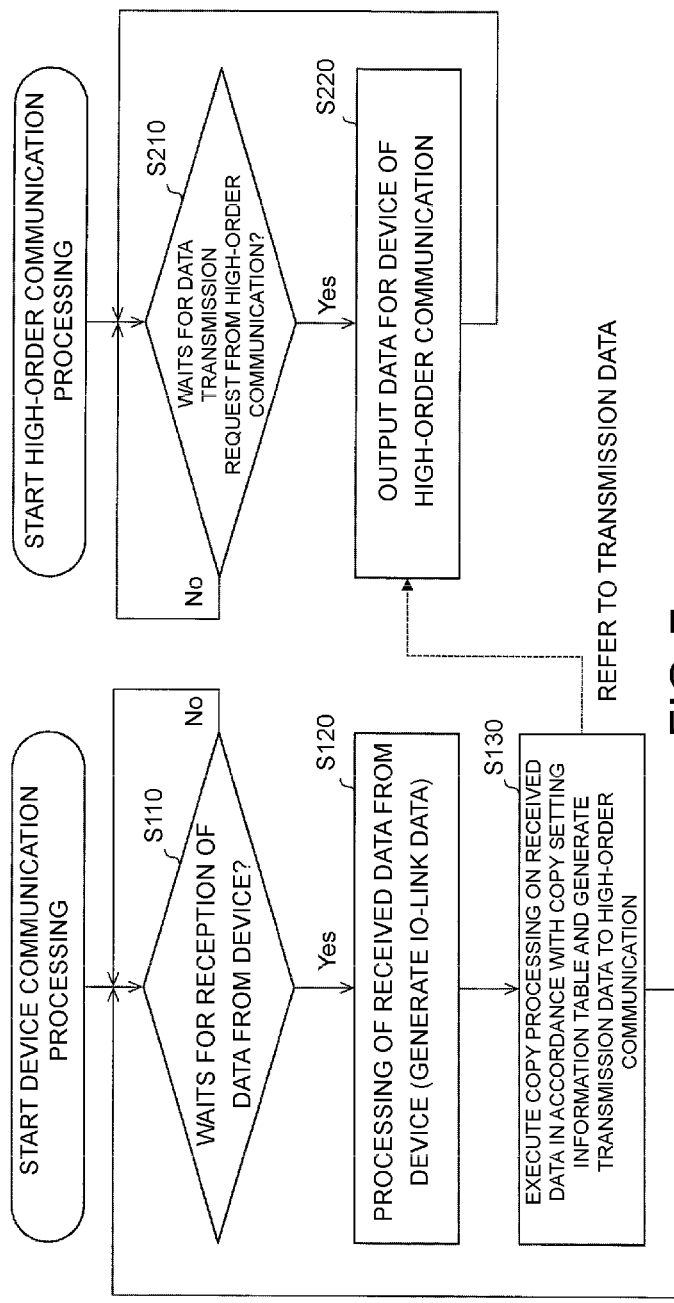
FIG. 7 is a flowchart illustrating an outline of processing performed by the device communication management unit in FIG. 1.

FIG. 7 is a flowchart illustrating an outline of processing performed by the device communication management unit 10. That is, the device communication processing unit 101 (particularly, the device communication reception processing unit 102) waits for reception of the data (signal) output from the device 20 that is connected to the device communication port 110 (S110) and stands by for the reception (No in S110).

If the device communication processing unit 101 receives the data from the device 20 (Yes in S110), reception processing is performed (S120, a data generation step). For example, the output data generation unit 105 generates the IO-Link data D1 from "the signal including the ON/OFF information and the analog information" output from the device 20 that is the device 20(C).

The device communication management unit 10 executes copy processing on the received data from the device 20 according to the copy setting information table 141 and creates transmission data (that is, the digital input data D2) for the high-order communication (field network 50) (S130, a duplication step). Specifically, the copy processing unit 106 stores the ON/OFF information received by the device communication port 110, for which the "copy method=PIN2/SIO" has been set, at the predetermined position in the digital input data D2 with reference to the copy setting information table 141. The copy processing unit 106 copies the signal stored at the predetermined position in the IO-Link data D1 that stores the signal received by the device communication port 110, for which the "copy method=IO-Link data" has been set", to the predetermined position in the digital input data D2.

The high-order communication control unit 130 (particularly, the high-order communication reception processing unit 132) waits for a data transmission request from the high-order communication (the field network 50, that is, the high-order controller 40) (S210) and stands by for the reception of the request (No in S210).

If the high-order communication control unit 130 receives the data transmission request (Yes in S210), the high-order communication control unit 130 (particularly, the high-order communication transmission processing unit 133) outputs the data of the device 20 to the high-order communication (S220). Specifically, the high-order communication transmission processing unit 133 transmits the IO-Link data D1 and the digital input data D2 to the high-order controller 40 via the field network 50.

The control method executed by the device communication management unit 10 is a method of controlling a slave device that is connected to the high-order controller 40 (controller) that serves as a master device. The slave device includes the device communication port 110 (communication port) to which the device 20 is connected, and the control method includes the data generation step (S120) of generating the IO-Link data D1 (first data) that is data including the ON/OFF information and the analog information from the device 20 and the duplication step (S130) of generating the digital input data D2 (second data) that is data storing only the ON/OFF information and to be delivered to the high-order controller 40 from the IO-Link data D1 in accordance with the copy setting information table 141 (the setting information set by the user). The copy setting information table 141 associates the storage position of the ON/OFF information in the IO-Link data D1 with the storage position of the ON/OFF information in the digital input data D2.

According to the aforementioned method, the control method generates the digital input data D2 that stores only the ON/OFF information and is to be delivered to the high-order controller 40 from the IO-Link data D1 that includes the ON/OFF information and the analog information from the device 20 in accordance with the copy setting information table 141 set by the user.

Here, the high-order controller 40 executes various kinds of control processing by utilizing the ON/OFF information from the device 20. In addition, the position at which the ON/OFF information is stored in the data output from the device 20 and the position at which the ON/OFF information is stored in the IO-Link data D1 vary depending on each device 20.

The ON/OFF information from the device 20 is stored at the predetermined position in the digital input data D2 in accordance with the copy setting information table 141 set by the user.

Then, the high-order controller 40 can utilize the digital input data D2 in which the ON/OFF information from the device 20 is stored at the predetermined position in accordance with the copy setting information table 141 when the various kinds of control processing is executed by utilizing the ON/OFF information from the device 20.

Even in a case in which the device 20 is exchanged, for example, the device communication management unit 10 can cause the high-order controller 40 to execute the control processing merely by changing the copy setting information table 141 in accordance with the device 20 after the exchange without changing the program of the high-order controller 40 that refers to the ON/OFF information. That is, the device communication management unit 10 can cause the high-order controller 40 to execute the control processing by utilizing the ON/OFF information that is stored at the predetermined position in the digital input data D2 in accordance with the copy setting information table 141 set by the user.

Therefore, the control method has an effect that the program of the high-order controller 40 that refers to the ON/OFF information is made to be independent from the device 20, for example, to facilitate the recovery of the high-order controller 40 from the exchange or the like of the device 20, and the time required for the recovery can be shortened. That is, the control method has an effect that it is possible to easily exchange the device 20 without changing the program or the like of the high-order controller 40 that refers to the ON/OFF information from the device connected to the device communication management unit 10.

(Method of Generating Digital Input Data)

A method of generating the digital input data D2 corresponding to signals output from the devices 20(1) to 20(4) that are connected to the respective device communication ports 110(1) to 110(4) with reference to the copy setting information table 141 by the copy processing unit 106 will be described below. Specifically, the information stored in the copy setting information table 141 and the method of generating the digital input data D2 by the copy processing unit 106 will be associated and described with reference to FIGS. 8 to 12.

In addition, signals P2(1) to P2(n) are assumed to represent signals received at the second pins of the respective device communication ports 110(1) to 110(n) in FIGS. 8 to 12. In addition, signals DI1 to DIn are assumed to be ON/OFF information output from the respective devices 20(1) to 20(n) connected to the respective device communication ports 110(1) to 110(n) and the signals DI1 to DIn represent signals received at the fourth pins of the device communication ports 110.

(In Case in Which "PIN2/SIO" is Set as Copy Method of Device 20(C))

Figure 8:
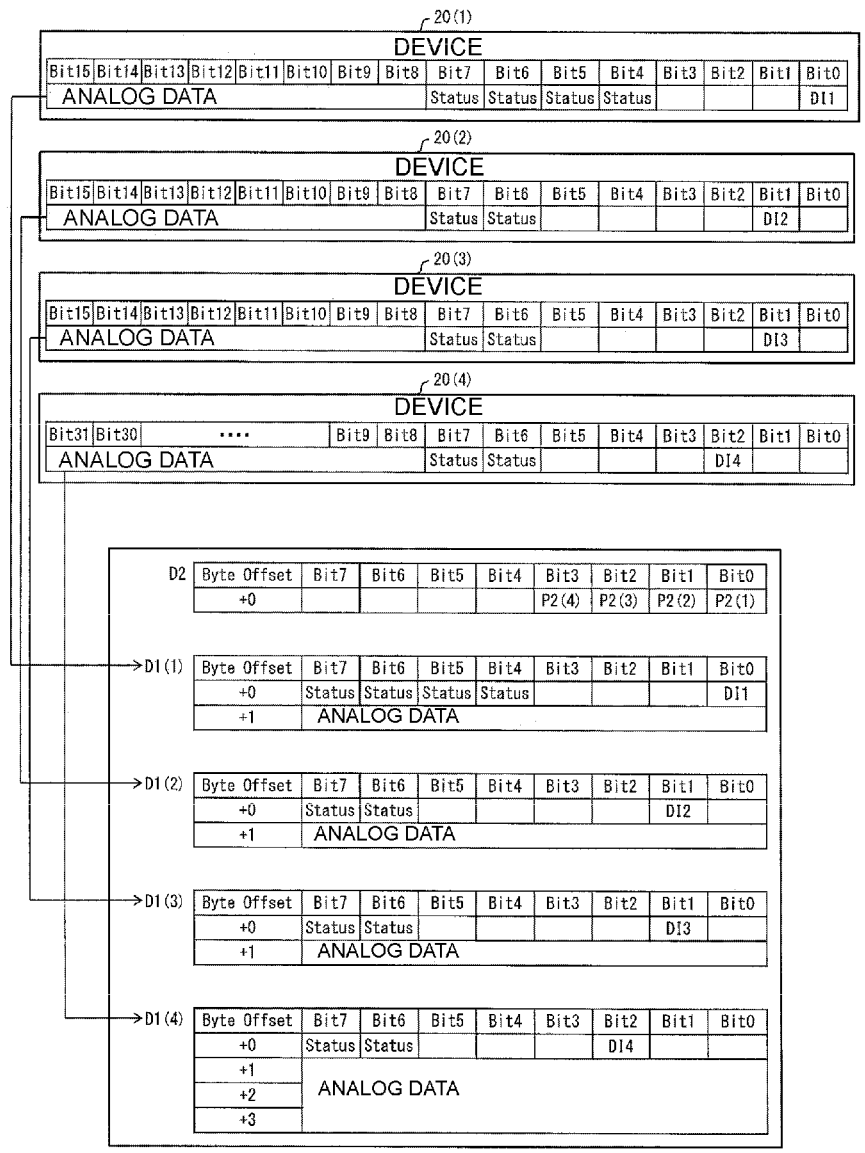
FIG. 8 is a diagram illustrating examples of IO-Link data and digital input data in a case in which a device 20(C) is connected to a device communication port for which "copy method=PIN2/SIO" is set.

FIG. 8 shows examples of the IO-Link data D1 and the digital input data D2 that are generated when the "copy method=PIN2/SIO" is set for the respective device communication ports 110(1) to 110(4) in the copy setting information table 141. Here, the IO-Link data D1 and the digital input data D2 illustrated as examples in FIG. 8 are the IO-Link data D1 and the digital input data D2 generated in a case in which all the devices 20(1) to 20(4) are the devices 20(C). In other words, FIG. 8 shows examples of the IO-Link data D1 and the digital input data D2 in a case in which the devices 20(C) are connected to the device communication port 110, for which the "copy method=PIN2/SIO" has been set.

The output data generation unit 105 generates IO-Link data D1(1) to D1(4) according to "the signal including the ON/OFF information and the analog information" output from the respective devices 20(1) to 20(4) that are devices 20(C). As illustrated in FIG. 8, the IO-Link data D1(1) to D1(4) include "the ON/OFF information and the analog information" output from the respective devices 20(1) to 20(4). Specifically, the respective IO-Link data D1(1) to D1(4) include the respective signals DI1 to DI4. In addition, the respective IO-Link data D1(1) to D1(4) include analog information (analog data).

The copy processing unit 106 generates the digital input data D2 from the signals received at the second pints of the respective device communication ports 110(1) to 110(4), for which the "copy method=PIN2/SIO" has been set, to which the devices 20(C) are connected. As described above, the device communication port 110 transmits and receives "only the ON/OFF information from the devices 20 connected to the device communication port 110" at the second pin in a case in which the devices 20 connected to the device communication port 110 are the devices 20(C).

As illustrated as an example in FIG. 8, the copy processing unit 106 stores the signal (ON/OFF information), which has been received at the second pin of the device communication port 110(n), at the n-th bit (Bit "n−1") in the digital input data D2. For example, the copy processing unit 106 stores a signal P2(1), which has been received at the second pin of the device communication port 110(1), at the first bit (Bit 0) in the digital input data D2. Similarly, a signal P2(2) which has been received at the second pin of the device communication port 110(2) is stored at Bit 1, a signal P2(3) which has been received at the second pin of the device communication port 110(3) is stored at Bit 2, and a signal P2(4) which has been received at the second pin of the device communication port 110(4) is stored at Bit 3. The digital input data D2 stores only the signals (ON/OFF information) received by the device communication port 110.

(In Case in Which "PIN2/SIO" is Set as Copy Method of Device 20(S))

Figure 9:
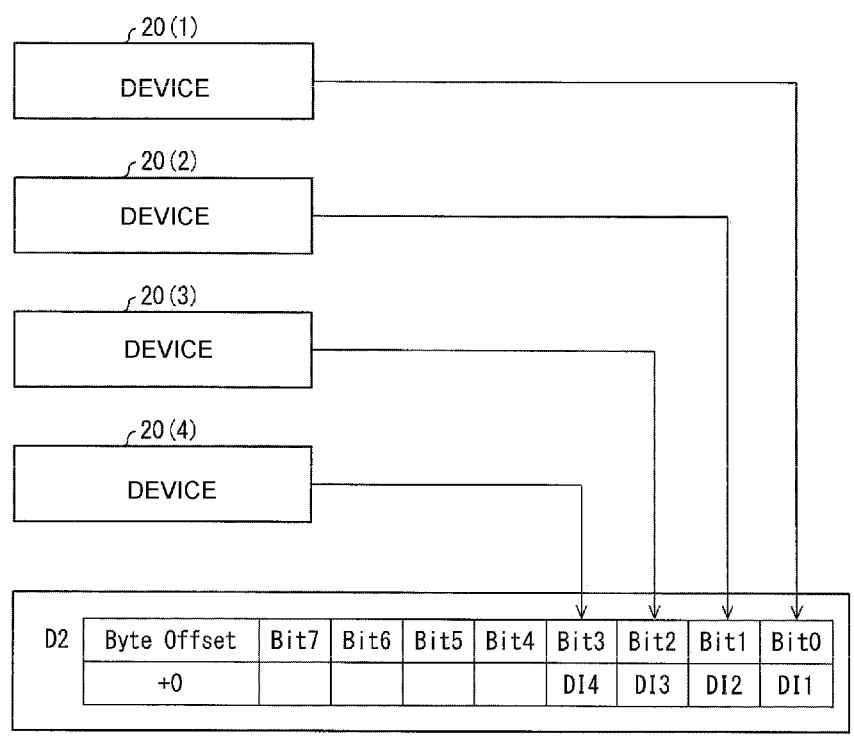
FIG. 9 is a diagram illustrating examples of the IO-Link data and the digital input data in a case in which a device 20(S) is connected to the device communication port for which "copy method=PIN2/SIO" is set.

FIG. 9 shows examples of the IO-Link data D1 and the digital input data D2 that are generated when the "copy method=PIN2/SIO" is set for the respective device communication ports 110(1) to 110(4) in the copy setting information table 141. Here, the IO-Link data D1 and the digital input data D2 illustrated as examples in FIG. 9 are IO-link data D1 and digital input data D2 that are generated in a case in which all the devices 20(1) to 20(4) are the devices 20(S). In other words, FIG. 9 shows examples of the IO-Link data D1 and the digital input data D2 in a case in which the devices 20(S) are connected to the device communication port, for which the "copy method=PIN2/SIO" has been set. The device 20(1) to 20(4) in FIG. 9 are, for example, the conventional On/OFF sensors.

The copy processing unit 106 generates the digital input data D2 from the signals DI1 to DIn received at the fourth pins of the respective device communication ports 110(1) to 110(4), for which the "copy method=PIN2/SIO" has been set, to which the devices 20(S) are connected. As described above, the device communication ports 110 transmit and receive "the ON/OFF information (signals DI1 to Din) from the devices 20 that are connected to the device communication ports 110" at the fourth pins in the case in which the devices 20 connected to the device communication ports 110 are the devices 20(S).

As illustrated as an example illustrated in FIG. 9, the copy processing unit 106 stores the signal (ON/OFF information), which has been received at the fourth pin of the device communication port 110(n), at the n-th bit (Bit "n−1") in the digital input data D2. For example, the copy processing unit 106 stores a signal DI1, which has been received at the fourth pin of the device communication port 110(1), at the first bit (Bit 0) in the digital input data D2. Similarly, a signal DI2 which has been received at the fourth pin of the device communication port 110(2) is stored at Bit 1, a signal DI3 which has been received at the fourth pin of the device communication port 110(3) is stored at Bit 2, and a signal DI4 which has been received at the fourth pin of the device communication port 110(4) is stored at Bit 3. The digital input data D2 stores only the signals (ON/OFF information) received by the device communication ports 110.

(Summarization of Cases in Which "PIN2/SIO" is Set as Copy Method)

As illustrated in FIGS. 8 and 9, the copy processing unit 106 generates the digital input data D2 by the following method in the case in which the "copy method=PIN2/SIO" has been set for a certain device communication port 110 in the copy setting information table 141.

That is, for a device communication port 110, for which the "copy method=PIN2/SIO" has been set, the copy processing unit 106 directly stores the signal received by the device communication port 110 in the digital input data D2. Specifically, the copy processing unit 106 stores the signal (ON/OFF information) that has been received at the second pin of the device communication port 110(n), for which the "copy method=PIN2/SIO" has been set, to which the device 20(C) is connected, at the n-th bit in the digital input data D2. In addition, the copy processing unit 106 stores the signal (ON/OFF information) that has been received at the fourth pin of the device communication port 110(n), for which the "copy method=PIN2/SIO" has been set, to which the device 20(S) is connected, at the n-th bit in the digital input data D2.

Figure 10:
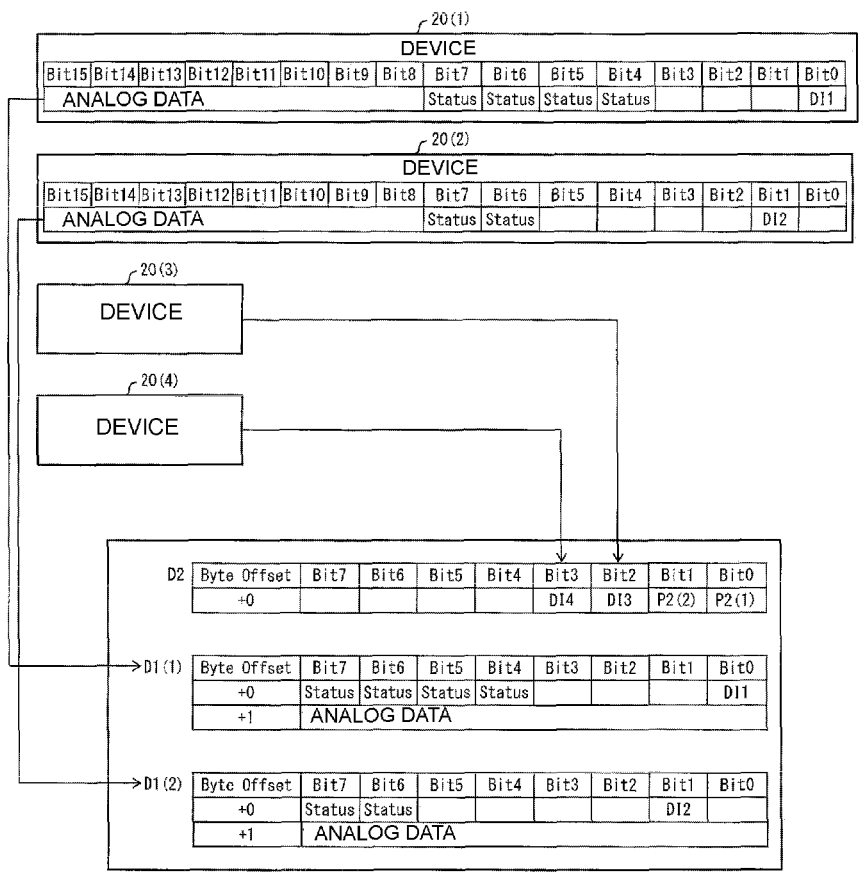
FIG. 10 is a diagram illustrating examples of the IO-Link data and the digital input data in a case in which the device 20(C) and the device 20(S) are connected to the device communication ports for which "copy method=PIN2/SIO" is set.

FIG. 10 shows examples of the IO-Link data D1 and the digital input data D2 that are generated when the "copy method=PIN2/SIO" is set for the respective device communication ports 110(1) to 110(4) in the copy setting information table 141. Here, the IO-Link data D1 and the digital input data D2 illustrated as examples in FIG. 10 are IO-Link data D1 and digital input data D2 that are generated in a case in which the devices 20(1) and 20(2) are the devices 20(C) and the devices 20(3) and 20(4) are the devices 20(S). In other words, FIG. 10 shows examples of the IO-Link data D1 and the digital input data D2 in a case in which the devices 20(C) and the devices 20(S) are connected to the device communication ports 110, for which the "copy method=PIN2/SIO" has been set. The device 20(3) and 20(4) in FIG. 10 are, for example, the conventional On/OFF sensors.

The output data generation unit 105 generates the IO-Link data D1(1) and D1(2) from "the signals including the ON/OFF information and the analog information" output from the respective devices 20(1) and 20(2) that are the devices 20(C). The IO-Link data D1(1) and D1(2) includes "the ON/OFF information and the analog information" output from the devices 20(1) and 20(2).

The copy processing unit 106 stores the respective signals, which have been received at the second pins of the device communication ports 110(1) and 110(2), for which the "copy method=PIN2/SIO" has been set, to which the devices 20(C) are connected, at the first bit and the second bit in the digital input data D2. In addition, the copy processing unit 106 stores the respective signals that have been received at the fourth pins of the respective device communication ports 110(3) and 110(4), for which the "copy method=PIN2/SIO" has been set, to which the devices 20(S) are connected, at the third bit and the fourth bit in the digital input data D2.

That is, as illustrated in FIG. 10, the copy processing unit 106 stores the signal P2(1), which has been received at the second pin of the device communication port 110(1), at the first bit, and stores the signal P2(2), which has been received at the second pin of the device communication port 110(2), at the second bit in the digital input data D2. The copy processing unit 106 stores the signal DI3, which has been received at the fourth pin of the device communication port 110(3), at the third bit and stores the signal DI4, which has been received at the fourth pin of the device communication port 110(4), at the fourth bit in the digital input data D2.

(Case in Which "IO-Link Data" has been Set as Copy Method)

Figure 11:
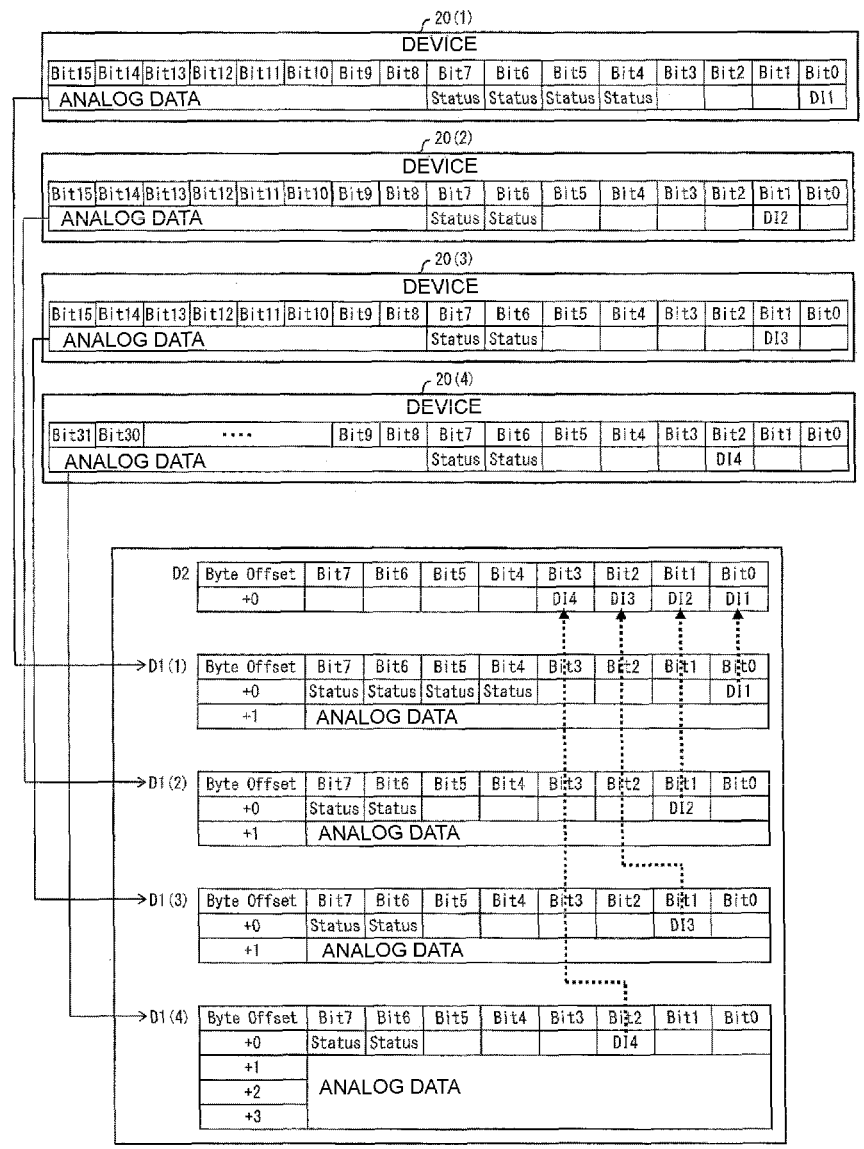
FIG. 11 is a diagram illustrating examples of the IO-Link data and the digital input data related to the device communication port for which "copy method=IO-Link data" is set.

FIG. 11 shows examples of the IO-Link data D1 and the digital input data D2 that are generated when the "copy method=IO-Link data" is set for the respective device communication ports 110(1) to 110(4) in the copy setting information table 141. Here, The IO-Link data D1 and the digital input data D2 illustrated in FIG. 11 are IO-Link data D1 and digital input data D2 that are generated in a case in which all the devices 20(1) to 20(4) are the devices 20(C).

In the example illustrated in FIG. 11, the copy setting information table 141 is assumed to store the following information. That is, (Information 1) the "copy method=IO-Link data", the "From position=0", and the "To position=0" have been set for the device communication port 110(1). (Information 2) The "copy method=IO-Link data", the "From position=1", and the "To position=1" have been set for the device communication port 110(2). (Information 3)

The "copy method=IO-Link data", the "From position=1", and the "To position=2" have been set for the device communication port 110(3). (Information 4) The "copy method=IO-Link data", and the "From position=2", and the "To position=3" have been set for the device communication port 110(4).

The output data generation unit 105 generates the IO-Link data D1(1) to D1(4) from "the signals including the ON/OFF information and the analog information" output from the respective devices 20(1) to 20(4) that are the devices 20(C). The IO-Link data D1(1) to D1(4) include "the ON/OFF information and the analog information" output from the respective devices 20(1) to 20(4).

The copy processing unit 106 copies the signal DI1 that has been stored at "Bit 0" in the IO-Link data D1(1) in accordance with the information 1 stored in the copy setting information table 141 and stores the copied value at "Bit 0" in the digital input data D2. Similarly, the copy processing unit 106 copies the signal DI2 that has been stored at "Bit 1" in the IO-Link data D1(2) in accordance with the information 2 and stores the copied value at "Bit 1" in the digital input data D2. The copy processing unit 106 copies the signal DI3 that has been stored at "Bit 1" in the IO-Link data D1(3) in accordance with the information 3 and stores the copied value at "Bit 2" in the digital input data D2. The copy processing unit 106 copies the signal DI4 that has been stored at "Bit 2" in the IO-Link data D1(4) in accordance with the information 4 and stores the copied value at "Bit 3" in the digital input data D2.

As illustrated in the example in FIG. 11, the digital input data D2 is generated as follows for the device communication ports 110(1) to 110(4), for which the "copy method=IO-Link data" has been set, in the copy setting information table 141.

First, the copy processing unit 106 stores the signals (the ON/OFF information and the analog information) output from the respective devices 20(1) to 20(4) connected to the respective device communication ports 110(1) to 110(4) in the IO-Link data D1(1) to D1(4).

Second, the copy processing unit 106 generates the digital input data D2, which stores the ON/OFF information from the devices 20(1) to 20(4), from the IO-Link data D1(1) to D1(4) in accordance with the copy setting information table 141. Specifically, the copy processing unit 106 copies the signals that are stored at predetermined positions of the devices 20(1) to 20(4) with reference to the copy setting information table 141 and stores the copied signals at predetermined positions in the digital input data D2.

(Change in Copy Source that Accompanies Exchange of Device to be Connected)

Figure 12:
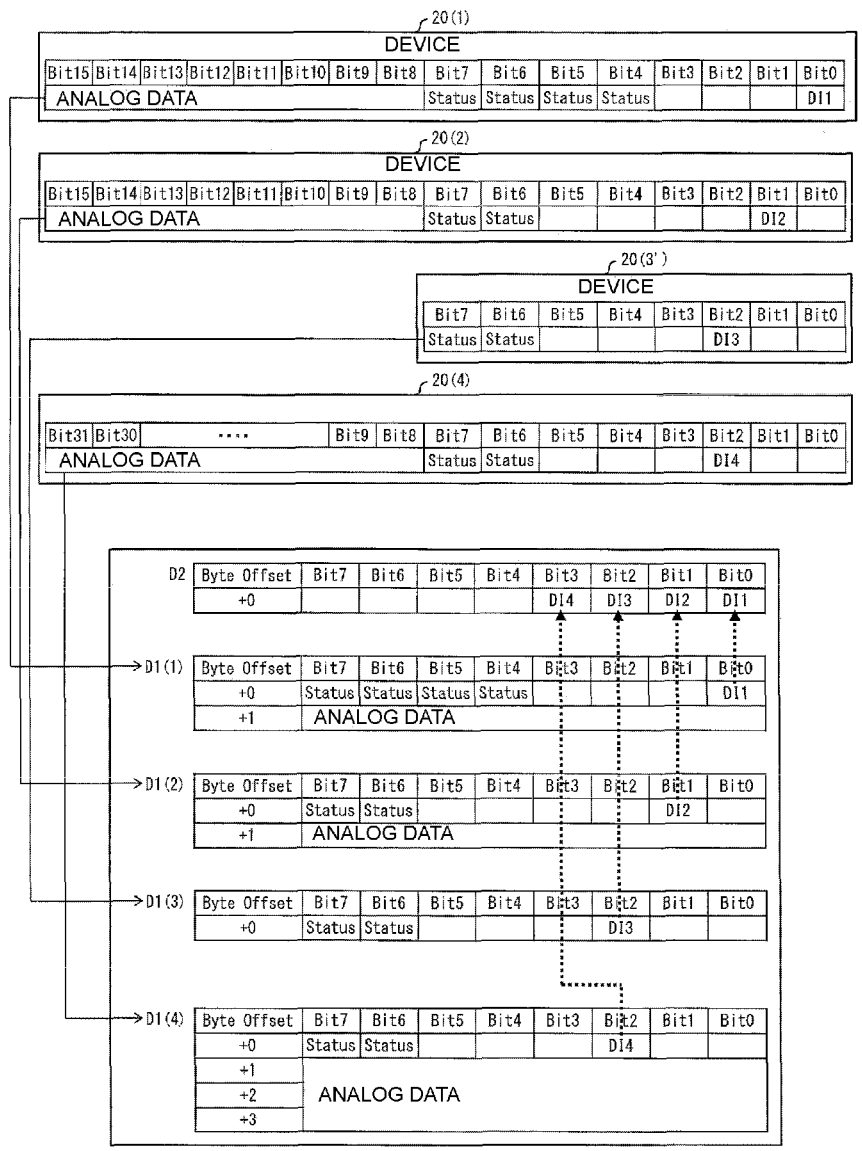
FIG. 12 is a diagram illustrating examples of the IO-Link data and the digital input data in a case in which a device to be connected to a certain device communication port has been exchanged in the situation illustrated in FIG. 11.

FIG. 12 shows examples of the IO-Link data D1 and the digital input data D2 that are generated when the "copy method=IO-Link data" is set for the respective device communication ports 110(1) to 110(4) in the copy setting information table 141. Here, the IO-Link data D1 and the digital input data D2 illustrated in FIG. 12 are IO-Link data D1 and digital input data D2 that are generated in a case in which all the devices 20(1) to 20(4) are the devices 20(C).

In the situation illustrated in FIG. 12, the user has exchanged the device connected to the device communication port 110(3) from a device 20(3) to a device 20(3') from the situation illustrated in FIG. 11. In other words, FIG. 12 shows examples of the IO-Link data D1 and the digital input data D2 in a case in which the device connected to the device communication port 110(3) has been exchanged in the situation illustrated in FIG. 11.

The user has changed the "From position=1" to the "From position=2" for the device communication port 110(3) on the copy information setting screen in accordance with the exchange from the device 20(3) to the device 20(3'). That is, the user has changed the aforementioned information 3 that has been stored in the copy setting information table 141 to the information 3' described below by utilizing the copy information setting screen. (Information 3') The "copy method=IO-Link data", the "From position=2", and the "To position=2" have been set for the device communication port 110(3).

In addition, the other conditions are not different between the situation illustrated in FIG. 12 and the situation illustrated in FIG. 11. Therefore, events that occur with the event that "the device connected to the device communication port 110(3) is exchanged from the device 20(3) to the device 20(3') will be mainly described below, and description of events with no change from FIG. 11 will be omitted.

The output data generation unit 105 generates the IO-Link data D1(3) from "the signals including the ON/OFF information and the analog information" output from the device 20(3') that is the device 20(C). The IO-Link data D1(3) includes the "ON/OFF information and the analog information" output from the device 20(3'). In accordance with the event that the device 20(3) has been exchanged as the device 20(3') from the situation illustrated in FIG. 11, a data format of the IO-Link data D1(3) illustrated in FIG. 12 is different from a data format of the IO-Link data D1(3) illustrated in FIG. 11. In particular, the position at which the ON/OFF information from the device 20(3) is stored (Bit 1 in FIG. 11) and the position at which the ON/OFF information from the device 20(3') is stored (Bit 2 in FIG. 12) are different in the IO-Link data D1(3).

The copy processing unit 106 copies the signal DI3 that is stored at "Bit 2" in the IO-Link data D1(3) in accordance with the information 3' that is stored in the copy setting information table 141 and stores the copied value at "Bit 2" in the digital input data D2.

(Concerning IO-Link)

In the control system 1, the device communication management unit 10 may communicate with the device 20 through an IO-Link (registered trademark). Here, the device communication management unit 10 can receive analog information in addition to ON/OFF information from the device 20 through the IO-Link communication. That is, the device communication management unit 10 can deliver the ON/OFF information from the device 20 and the analog information from the device 20 to the high-order controller 40. Then, the user can recognize the state of the device 20 by causing the high-order controller 40 or the like to accumulate and analyze the analog information and execute appropriate maintenance for the device 20, including planning of an exchange schedule for the device 20 and the like.

Therefore, the device communication management unit 10 has an effect that user can perform appropriate maintenance of the device 20 by utilizing the analog information. Further, the device communication management unit 10 has an effect that it is possible to easily recover the high-order controller 40 from the maintenance and to reduce the time required for the recovery. That is, the device communication management unit 10 has an effect that it is possible to recognize an appropriate exchange timing of the device 20 by utilizing the analog information and to easily exchange the device 20 without changing the program or the like of the high-order controller 40. An outline of IO-Link will be described below.

IO-Link is standardized with a name of "single-drop digital communication interface for small sensors and actuator" (SDCI) by IEC61131-9, and is a normalized technology for communication between a master (PCL) that is a control device (for example, the high-order controller 40 in the control system 1) and devices such as a sensor and an actuator (for example, the devices 20 in the control system 1). IO-Link is a novel point-to-point serial communication protocol that is used for communication between the master (PLC) and the devices such as the sensor and the actuator.

IO-Link is a communication protocol (for example, a communication protocol in the COM mode in the control system 1) capable of receiving and sending 32-byte (256-bit) data (bi-directional communication) unlike a prior art protocol (for example, a communication protocol in the SIO mode in the control system 1) capable only of sending the ON/OFF information (I/O signal) from the devices to the master (PLC). It is possible to acquire signals from the devices, from which only binary data such as ON/OFF information can be received in the prior art, as 32-byte numerical value data by coupling the master (PLC) and the devices such as a sensor and an actuator through IO-Link. Therefore, it is possible to acquire information such as the amount of received light, the detection of a remaining amount, and an internal temperature in a case of a photoelectric sensor, for example, to usefully employ the information for studying reasons of malfunction, and to change threshold values in accordance with diagnosis of a product lifetime and degradation over time.

It is possible to automate the setting and the maintenance, for example, of the device by utilizing the IO-Link. Also, it is possible to greatly simplify programming of the master (PLC) and further to realize cost reduction and the like of a wiring cable by utilizing the IO-Link. A photoelectric sensor and a proximity sensor can be exemplified as examples of the devices.

(IO-Link System)

An IO-Link system includes an IO-Link device (typically, a sensor, an actuator, or a combination thereof), a standard three-wire sensor/actuator cable, and an IO-Link master (for example, the device communication management unit 10 in the control system 1).

Here, the IO-Link master includes one or more ports, and one IO-Link device can be connected to each port. The IO-Link master performs point-to-point communication with the IO-Link device. The IO-Link master can transmit and receive not only binary data (ON/OFF information) such as prior art ON/OFF information but also information (analog information) other than binary data such as the ON/OFF information, such as identification information of the device, communication properties of the device, device parameters, and process/diagnosis data to and from the IO-Link device.

The IO-Link device means a device (for example, the device 20(C) in the control system 1) capable of transmitting and receiving the analog information in addition to the ON/OFF information to and from the IO-Link master.

(Two Communication Modes)

The IO-Link device can operate without the IO-Link master in a prior art digital exchange mode (for example, the SIO mode in the control system 1) that is called a standard IO (SIO), that is, the IO-Link device can use and operate the master that can receive only the binary data such as ON/OFF information from the sensor. Similarly, the IO-Link master can operate the prior art device (the device that can receive only the binary data such as ON/OFF information from the IO-Link master, and for example, the device 20(S) in the control system 1) by using the SIO.

Ports of the IO-Link master own configuration data. If a certain port is set to the SIO mode, the IO-Link master operates the port in the same manner as the prior art port (the port capable of transmitting and receiving only binary data such as ON/OFF information). If the port is set to a communication mode (COM mode) (for example, the COM mode in the control system 1), the IO-Link master can transmit and receive analog information in addition to the ON/OFF information to and from the device (the IO-Link device; for example, the device 20(C) in the control system 1) that is connected to the port.

Modification Examples (Modification Example of Operation Receiving unit) The example in which the device communication management unit 10 includes the operation receiving unit 104 has been described above, it is not essential for the device communication management unit 10 to include the operation receiving unit 104. In the control system 1, the high-order controller 40, the support tool 60, or the HMI, for example, may receive a user's operation (a setting operation and a change operation) on the copy information setting screen, and information corresponding to the user's operation may be stored in the copy setting information table 141.

(Modification Example of Copy Setting Information Table)

Although the example in which the device communication management unit 10 includes the storage unit 140 that stores the copy setting information table 141 has been described above, it is not essential for the device communication management unit 10 to include the storage unit 140 that stores the copy setting information table 141. In the control system 1, the high-order controller 40, the support tool 60, or the HMI, for example, may store the copy setting information table 141. That is, the device communication management unit 10 may acquire information (copy setting information) that is stored in the copy setting information table 141 from an external device such as the high-order controller 40, the support tool 60, and the HMI, for example. The device communication management unit 10 may be able to generate the digital input data D2 that stores only the ON/OFF information that has been received from the respective device communication ports 110(1) to 110(n) by utilizing the copy setting information table 141. That is, the copy processing unit 106 may be able to generate the digital input data D2 that stores only the ON/OFF information from the respective devices 20(1) to 20(n) by utilizing the copy setting information table 141.

In addition, the example in which the copy setting information table 141 associates the information of the "copy source" with the information of the "copy destination" for each device communication port 110 has been described above. This is just an example of the copy setting information table 141 on the assumption that the device communication management unit 10 includes a plurality of device communication ports 110(1) to 110(n). In a case in which the device communication management unit 10 includes only one device communication port 110, the copy setting information table 141 may not associate the information of the "copy source" and the information of the "copy destination" for each device communication port. The copy setting information table 141 may associate the Bit position at which the "ON/OFF information" is stored in the IO-Link data D1 storing "the ON/OFF information and the analog information" of the device 20 with the Bit position of the digital input data D2 storing the "ON/OFF information".

[Example of Implementation by Software]

Control blocks (particularly, each of the high-order communication control unit 130 and the device communication control unit 100) of the device communication management unit 10 may be realized by logical circuits (hardware) formed on an integrated circuit (IC chip) or may be realized by software by using a central processing unit (CPU).

In the latter case, the device communication management unit 10 includes a CPU that executes commands of a program that is software for realizing the respective functions, a read only memory (ROM) or a storage device (these will be referred to as a "recording medium") in which the above program and various kinds of data are recorded in a readable manner by a computer (or the CPU), a random access memory (RAM) that buffers the program, and the like. Then, the object of the disclosure is achieved by the computer (or the CPU) reading the program from the recording medium and executing the program. As the recording medium, a "non-transient (non-volatile) tangible medium" such as a tape, a disc, a card, a semiconductor memory, or a programmable logical circuit, for example, can be used. In addition, the program may be supplied to the computer via an arbitrary delivery medium (a communication network, a broadcasting wave, or the like) capable of delivering the program. In addition, the disclosure can also be realized in the form of a data signal that is obtained by implementing the program by electronic delivery and is incorporated in a carrier wave.

The disclosure is not limited to the aforementioned respective embodiments, various modifications can be made within the scope defined by the claims, and embodiments achieved by appropriately combining technical means disclosed in different embodiments are also included in the technical scope of the disclosure.

What is claimed is:

1. A slave device that is connected to a controller that serves as a master device, wherein the slave device comprises a communication port to which a device is connected, and the slave device comprises:
    a data generation unit that generates first data that is data including ON/OFF information and analog information from the device; and
    a duplication unit that generates second data from the first data in accordance with setting information set by a user,
    wherein the ON/OFF information is stored at a first storage position in the first data,
    the ON/OFF information is stored at a second storage position in the second data,
    the setting information associates the first storage position in the first data with the second storage position in the second data,
    the second data is data storing only the ON/OFF information,
    the second data is to be delivered to the controller,
    the slave device is communicated with the device in one of a first mode and a second mode,
    the data including the ON/OFF information and the analog information is transmitted in the first mode, and data only including the ON/OFF information is transmitted in the second mode.

2. The slave device according to claim 1, comprising:
    a plurality of communication ports,
    wherein the setting information associates the first storage position of the ON/OFF information in the first data with the second storage position of the ON/OFF information in the second data for each of the communication ports.

3. The slave device according to claim 1, further comprising:
    a storage unit that stores the setting information.

4. The slave device according to claim 2, further comprising:
    a storage unit that stores the setting information.

5. The slave device according to claim 1, further comprising:
    an operation receiving unit that receives a user's operation of setting or changing the setting information.

6. The slave device according to claim 2, further comprising:
    an operation receiving unit that receives a user's operation of setting or changing the setting information.

7. The slave device according to claim 3, further comprising:
    an operation receiving unit that receives a user's operation of setting or changing the setting information.

8. The slave device according to claim 4, further comprising:
    an operation receiving unit that receives a user's operation of setting or changing the setting information.

9. A control method of a slave device that is connected to a controller that serves as a master device, wherein the slave device comprises a communication port to which a device is connected, and the method comprises:
    a communication step of communicating with the device in one of a first mode and a second mode, wherein data including ON/OFF information and analog information is transmitted in the first mode, and data only including the ON/OFF information is transmitted in the second mode;
    a data generation step of generating first data that is the data including the ON/OFF information and the analog information from the device; and
    a duplication step of generating second data from the first data in accordance with setting information set by a user,
    wherein the ON/OFF information is stored at a first storage position in the first data,
    the ON/OFF information is stored at a second storage position in the second data,
    the setting information associates the first storage position in the first data with the second storage position in the second data,
    the second data is data storing only the ON/OFF information, and
    the second data is to be delivered to the controller.

10. A non-transitory computer readable recording medium that records information processing program which is readable by a computer and configured to cause the computer to function as a slave device, and the information processing program is further configured to cause the computer functions as a data generation unit and a duplication unit,
    wherein the data generation unit generates first data that is data including ON/OFF information and analog information from a device,
    the duplication unit generates second data from the first data in accordance with setting information set by a user,
    the ON/OFF information is stored at a first storage position in the first data,
    the ON/OFF information is stored at a second storage position in the second data, the setting information associates the first storage position in the first data with the second storage position in the second data, the second data is data storing only the ON/OFF information, the second data is to be delivered to a controller, the slave device is communicated with the device in one of a first mode and a second mode, the data including the ON/OFF information and the analog information is transmitted in the first mode, and data only including the ON/OFF information is transmitted in the second mode.

11. The non-transitory computer readable recording medium according to claim 10, wherein the slave device comprises a plurality of communication ports, the setting information associates the first storage position of the ON/OFF information in the first data with the second storage position of the ON/OFF information in the second data for each of the communication ports.

12. The non-transitory computer readable recording medium according to claim 10, wherein the information processing program is further configured to cause the computer functions as a storage unit that stores the setting information.

13. The non-transitory computer readable recording medium according to claim 11, wherein the information processing program is further configured to cause the computer functions as a storage unit that stores the setting information.

14. The non-transitory computer readable recording medium according to claim 10, wherein the information processing program is further configured to cause the computer functions as an operation receiving unit that receives a user's operation of setting or changing the setting information.

15. The non-transitory computer readable recording medium according to claim 11, wherein the information processing program is further configured to cause the computer functions as an operation receiving unit that receives a user's operation of setting or changing the setting information.

16. The non-transitory computer readable recording medium according to claim 12, wherein the information processing program is further configured to cause the computer functions as an operation receiving unit that receives a user's operation of setting or changing the setting information.

17. The non-transitory computer readable recording medium according to claim 13, wherein the information processing program is further configured to cause the computer functions as an operation receiving unit that receives a user's operation of setting or changing the setting information.

* * * * *